(12) United States Patent
Kudoh et al.

(10) Patent No.: US 8,650,654 B2
(45) Date of Patent: Feb. 11, 2014

(54) MEMORY DEVICE, MEMORY SYSTEM, AND AUTHENTICATION METHOD

(75) Inventors: Yoshiyuki Kudoh, Kawasaki (JP); Takashi Kuzuhara, Higashiyamato (JP); Teruji Yamakawa, Tokyo (JP); Kenichi Numata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 13/170,138

(22) Filed: Jun. 27, 2011

(65) Prior Publication Data

US 2012/0072736 A1    Mar. 22, 2012

(30) Foreign Application Priority Data

Sep. 17, 2010    (JP) .................................. 2010-209895

(51) Int. Cl.
*G06F 13/00* (2006.01)

(52) U.S. Cl.
USPC .................... 726/26; 726/2; 726/27; 713/189

(58) Field of Classification Search
USPC ........................... 713/189, 193; 726/2, 26, 27
See application file for complete search history.

(56) References Cited

U.S. PATENT DOCUMENTS

| | | | |
|---|---|---|---|
| 6,968,459 B1* | 11/2005 | Morgan et al. ................ | 713/189 |
| 8,281,114 B2* | 10/2012 | Linetsky ........................... | 713/2 |
| 2003/0023867 A1* | 1/2003 | Thibadeau ..................... | 713/200 |
| 2003/0070083 A1* | 4/2003 | Nessler .......................... | 713/193 |
| 2006/0161445 A1* | 7/2006 | Frank .............................. | 705/1 |
| 2006/0268114 A1* | 11/2006 | Chan et al. ................. | 348/207.1 |
| 2007/0014536 A1* | 1/2007 | Hellman .......................... | 386/94 |
| 2007/0204006 A1* | 8/2007 | Vallis ............................. | 709/217 |
| 2008/0005584 A1* | 1/2008 | Shen .............................. | 713/186 |
| 2008/0072071 A1* | 3/2008 | Forehand et al. ............. | 713/193 |
| 2010/0199089 A1* | 8/2010 | Vysogorets et al. .......... | 713/168 |

FOREIGN PATENT DOCUMENTS

| | | |
|---|---|---|
| JP | 2004-201038 | 7/2004 |
| JP | 2004-295502 | 10/2004 |
| JP | 2006-164066 | 6/2006 |
| JP | 2007-282064 | 10/2007 |
| JP | 2008-005408 | 1/2008 |
| JP | 2008-148095 | 6/2008 |

OTHER PUBLICATIONS

Japanese Office Action dated Feb. 28, 2012, filed in Japanese counterpart Application No. 2011-230557, 4 pages (with English translation).

* cited by examiner

*Primary Examiner* — Tamara T Kyle

(74) *Attorney, Agent, or Firm* — Patterson & Sheridan LLP

(57) ABSTRACT

According to one embodiment, a memory device includes a third partial key write module, an encryption key write module, and a decryption module. The third partial key write module is configured to combine a second partial key received from the current host device with the first partial key in the partial key memory device and to write a generated third partial key into the volatile memory after the device authentication. The encryption key write module is configured to combine the third partial key with the second user authentication information and to write a generated encryption key into the volatile memory after the user authentication. The decryption module is configured to decrypt the encrypted data based on the encryption key in the volatile memory based on a read request received from the current host device and to output obtained data to the current host device when the user authentication has succeeded.

20 Claims, 22 Drawing Sheets

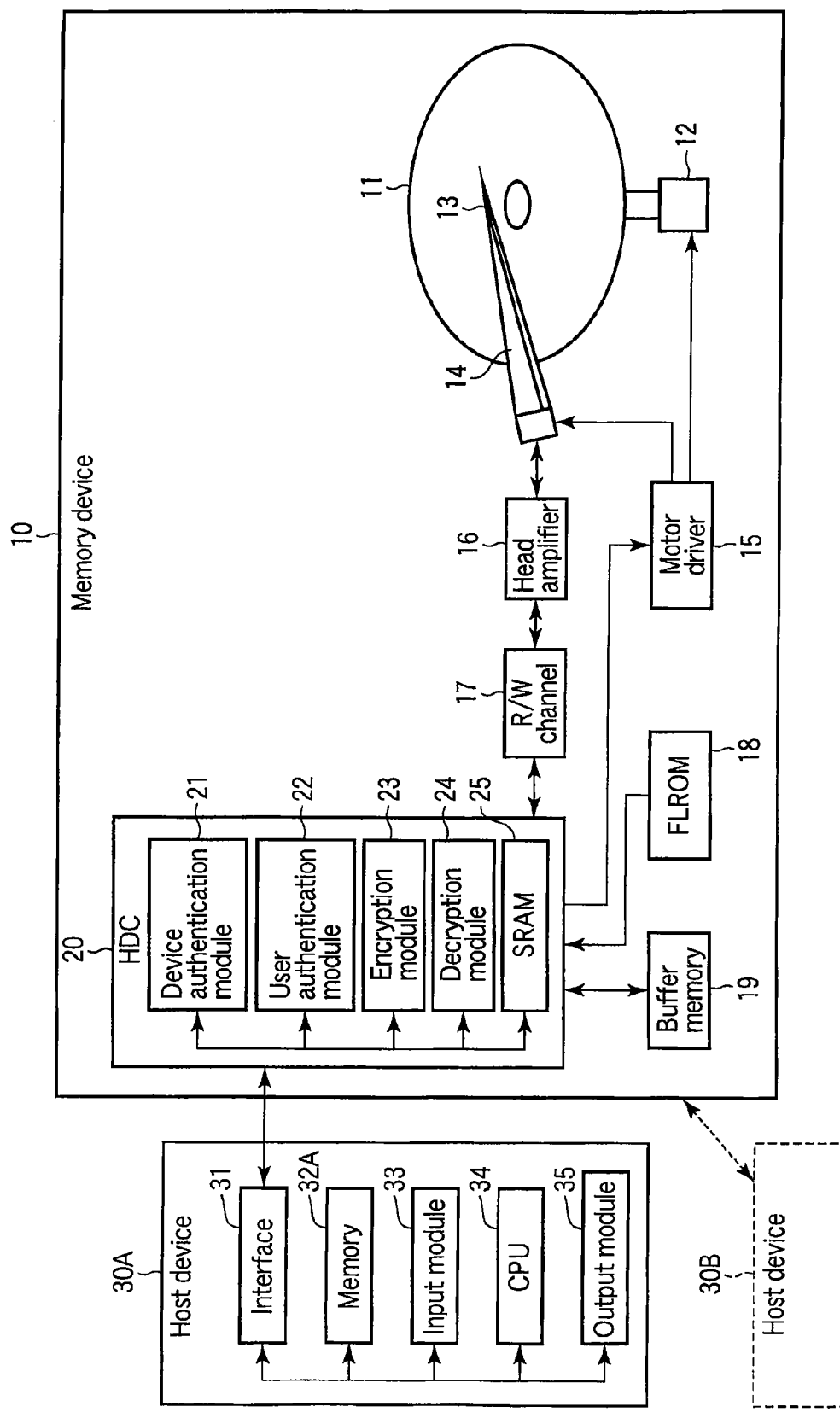
F I G. 1

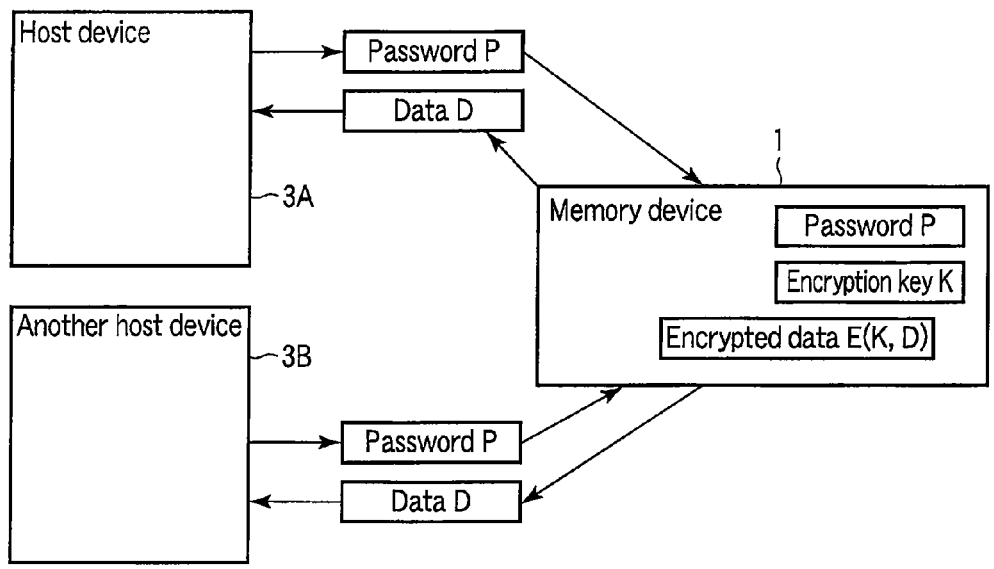
F I G. 11
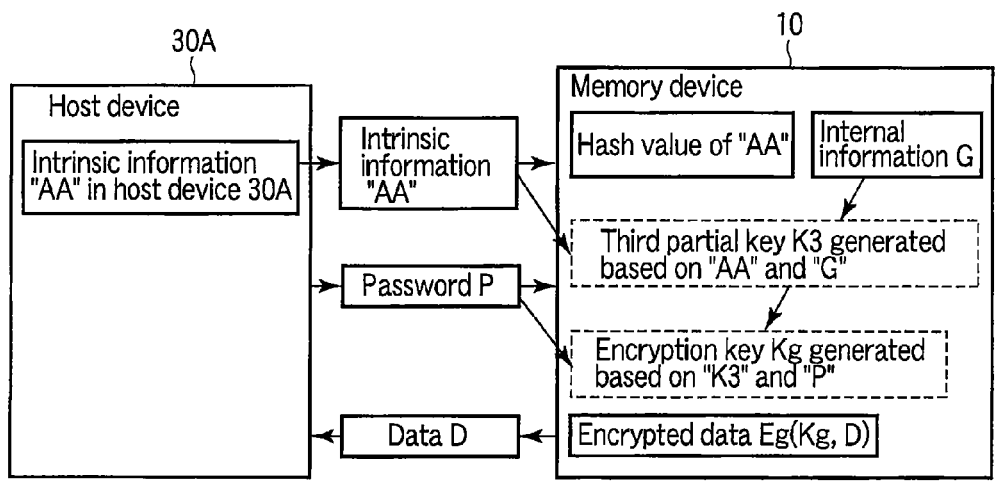
F I G. 12

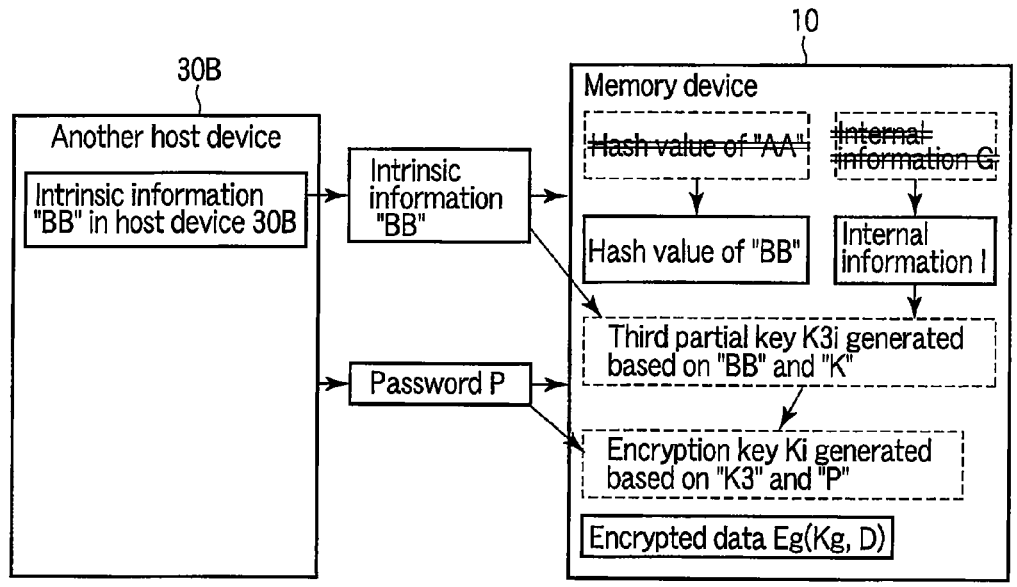
F I G. 13
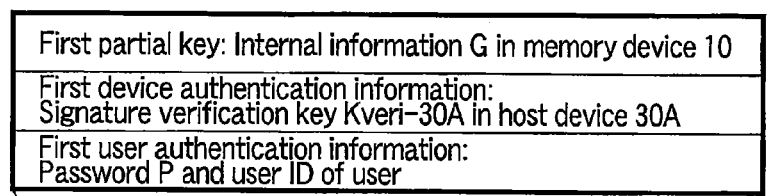
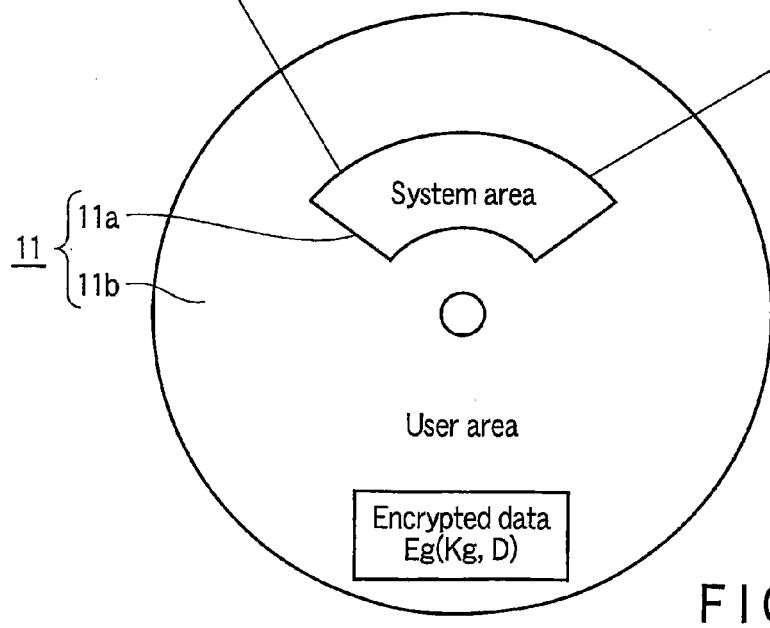
F I G. 14

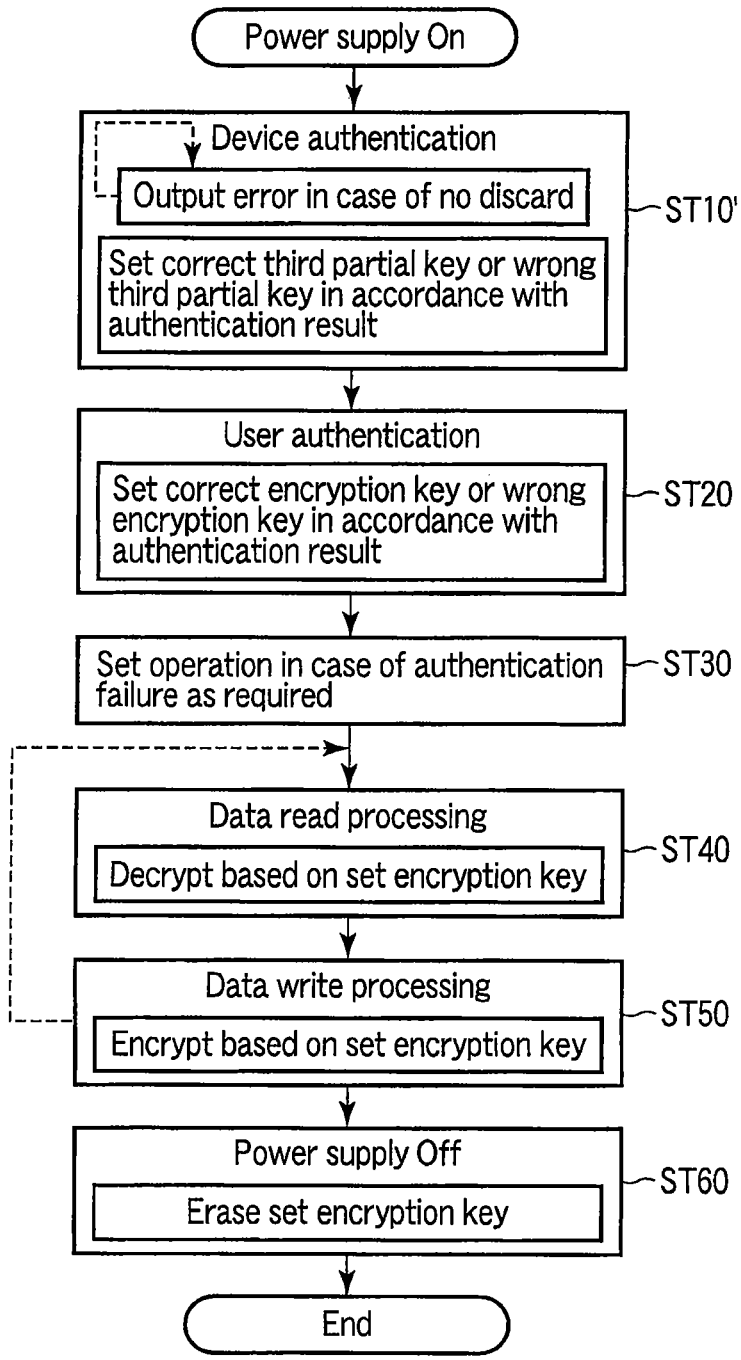
F I G. 20

MEMORY DEVICE, MEMORY SYSTEM, AND AUTHENTICATION METHOD

CROSS-REFERENCE TO RELATED APPLICATIONS

This application is based upon and claims the benefit of priority from Japanese Patent Application No. 2010-209895, filed Sep. 17, 2010; the entire contents of which are incorporated herein by reference.

FIELD

Embodiments described herein relate generally to a memory device, a memory system, and an authentication method.

BACKGROUND

Conventionally, an HDD (Hard Disk Drive) device (which will be referred to as a memory device hereinafter) having an encrypting function encrypts data by using a previously held encryption key and stores obtained encrypted data. This type of memory device sets the previously held encryption key as a decryption key when password authentication of a user who has an access right has succeeded, and decrypts encrypted data by using this decryption key to output resultant data. As described above, the conventional memory device can output correct data to a user who has an access right.

However, when a conventional memory device is taken out to an external system environment by a user who has an access right with encrypted data being stored, decrypted data may possibly be leaked because of success of password authentication.

Further, since a small memory device can be easily taken out, theft is apt to occur, and decrypted data can be leaked when a password is broken after a theft. Therefore, to avoid data leakage at the time of a theft, data must be assuredly nullified at a place that the memory device is brought out to.

As described above, the conventional memory device has a desire of nullification of stored data irrespective of an access right of a user when accessed from an environment different from a useable system environment.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram showing an encrypted data memory system according to a first embodiment;

FIG. 11 is an exemplary schematic view showing an operation of a memory system that executes general password authentication only;

FIG. 12 is an exemplary schematic view showing an operation when a legitimate host device is connected to a memory device in the second embodiment;

FIG. 13 is an exemplary schematic view showing an operation when an improper host device is connected to the memory device in the second embodiment;

FIG. 14 is an exemplary schematic view for explaining data in a disk in a third embodiment;

FIG. 20 is an exemplary flowchart for explaining an operation in the fifth embodiment;

DETAILED DESCRIPTION

Various embodiments will be described hereinafter with reference to the accompanying drawings.

In general, according to one embodiment, a memory device has a volatile memory in which data is erased when a power supply is turned off and is detachably connectable to arbitrary host devices. The memory device includes an authentication information memory device, a partial key memory device, an encrypted data memory device, a device authentication module, a third partial key write module, a user authentication module, an encryption key write module, and a decryption module. The authentication information memory device module is configured to configured to previously store first device authentication information used for performing device authentication for a legitimate host device having a connection right in the arbitrary host devices and first user authentication information used for authenticating a proper user who utilizes the legitimate host device. The partial key memory device is configured to previously store a first partial key constituting a part of an encryption key written into the volatile memory. The encrypted data memory device is configured to store encrypted data which is data encrypted based on the encryption key. The device authentication module is configured to execute device authentication based on second device authentication information received from a newly connected current host device and the first device authentication information in the authentication information memory device, and to discard the first partial key when the device authentication has failed. The third partial key write module is configured to combine a second partial key received from the current host device with the first partial key in the partial key memory device and to write a generated third partial key into the volatile memory after the device authentication. The user authentication module is configured to execute user authentication based on second user authentication information received from the current host device and the first user authentication information in the authentication information memory device after writing the third partial key. The encryption key write module is configured to combine the third partial key in the volatile memory with the second user authentication information and to write a generated encryption key into the volatile memory after the user authentication. The decryption module is configured to decrypt the encrypted data based on the encryption key in the volatile memory in response to a read request received from the current host device and to output obtained data to the current host device when the user authentication has succeeded.

First Embodiment

Figure 2:
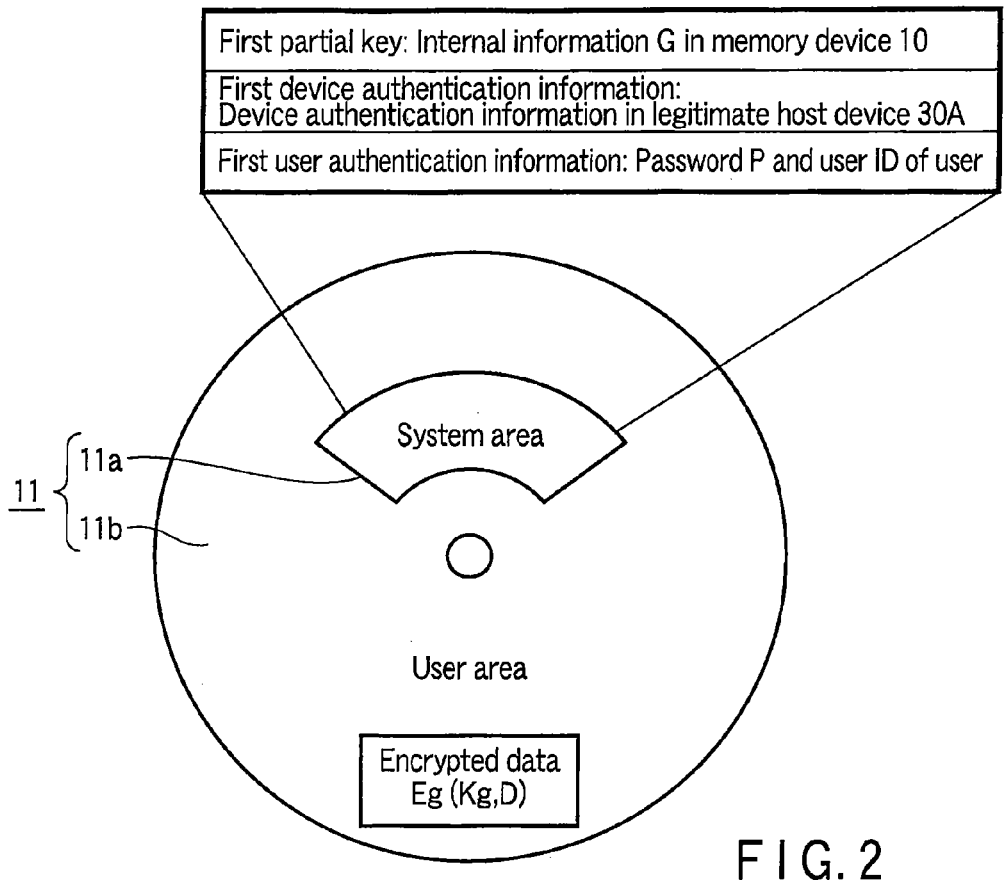
FIG. 2 is an exemplary schematic view for explaining data in a disk in the first embodiment.
Figure 3:
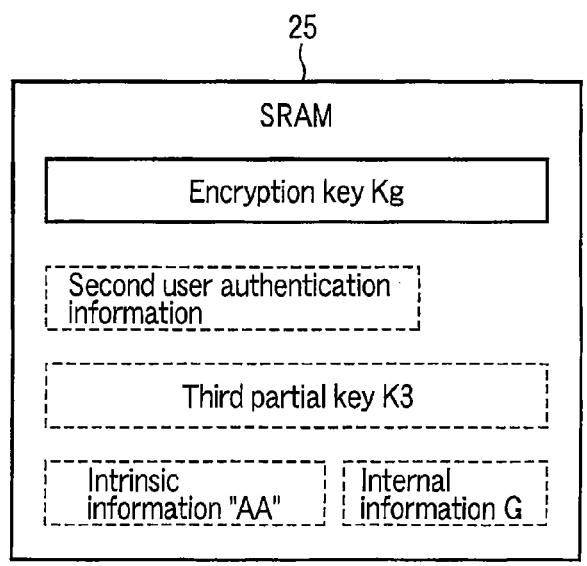
FIG. 3 is an exemplary schematic view for explaining data in a static RAM in the first embodiment.
Figure 4:
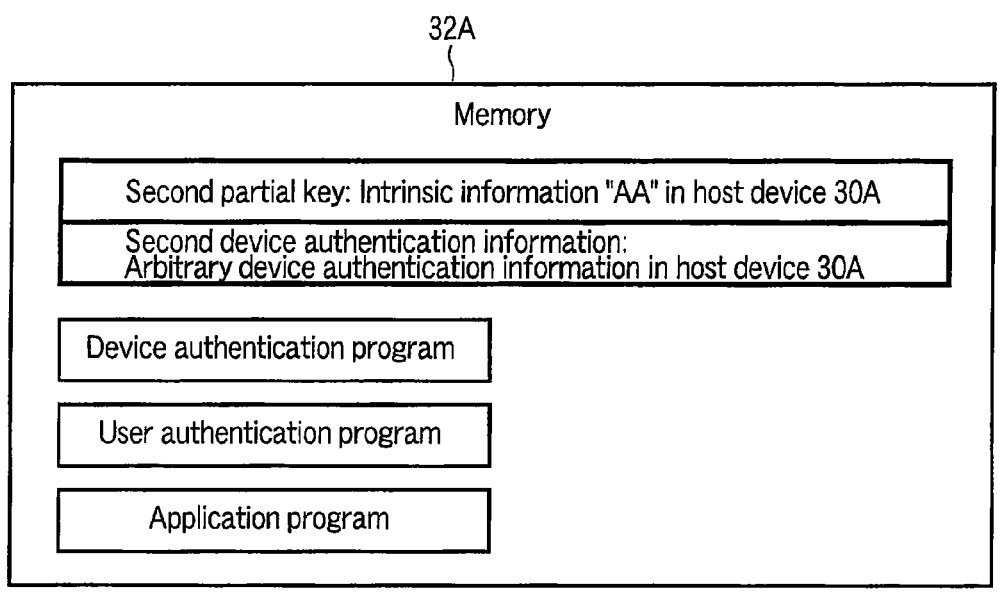
FIG. 4 is an exemplary schematic view for explaining data in a memory in the first embodiment.

FIG. 1 is a block diagram showing an example of a configuration of an encrypted data memory system according to a first embodiment, and FIG. 2 to FIG. 4 are schematic views for explaining data in a disk, an SRAM, and a memory. This memory system has a volatile memory in which data is erased when a power supply is turned off, and it includes a memory device 10 that can be detachably connected to arbitrary host devices 30A, 30B, . . . and a legitimate host device 30A having connection authority with respect to the memory device 10 in the arbitrary host devices 30A, 30B, . . . .

The memory device 10 includes a disk 11 as a magnetic storage medium, a spindle motor (an SPM) 12, a head 13, an actuator 14, a motor driver 15, a head amplifier 16, a read and write (R/W) channel 17, a flash memory (an FLROM) 18, a buffer memory 19, a hard disk controller (an HDC or simply a disk controller) 20.

As shown in FIG. 2, the disk 11 includes a system area 11a that a general user cannot access and a user area 11b that a general user can access. The system area 11a previously stores a first partial key, first device authentication information, and first user authentication information.

Here, the first partial key is key data constituting a part of an encryption key written into a static RAM 25 (a volatile memory). As the first partial key, for example, internal information G in the memory device 10 is used. Furthermore, the internal information G is previously written into the system area 11a from an encryption module 23 at the time of, e.g., initialization. Although a random number is exemplified as such internal information G, the present invention is not restricted to this example. The first partial key will be explained as the internal information G in the following description.

The first device authentication information is used for performing device authentication for the legitimate host device 30A having the connection authority in the connectable arbitrary host devices 30A, 30B, . . . , and device authentication information adopting an arbitrary device authentication system can be used. For example, as the first device authentication information, intrinsic information "AA" of the host device 30A or a signature generation key Ksig-30a of the host device 30A can be used, but the present invention is not restricted to these examples. Such first device authentication information is previously written into the system area 11a from a device authentication module 21 at the time of, e.g., initialization. As the device authentication system, it is possible to select any one from a system of collating the first device authentication information and second authentication information that are equal to each other and a system based on the first device authentication information and the second device authentication information that are different from each other as will be described in a second or third embodiment. As the intrinsic information of the host device 30A, for example, an MAC address can be used, but the present invention is not restricted to this example.

The first user authentication information is utilized to authenticate a proper user who uses the legitimate host device 30A. Although a password P and a user ID of the proper user are used as an example of the first user authentication information, the present invention is not restricted to this example. The first user authentication information may be previously written into the system area 11a from a user authentication module 22 at the time of, e.g., initialization.

The user area 11b stores encrypted data Eg(Kg, D) which is data D encrypted based on an encryption key Kg. This encrypted data Eg(Kg, D) is written into the user area 11b by an encryption module 23. It is to be noted that, in case of the internal information G, the lowercase letter "g" of "G" is used as a suffix, and "Eg" or "Kg" are represented in this example. For example, in case of internal information I, the lowercase letter "i" of "I" is used as a suffix, and "Ei" or "Ki" are represented.

The SPM 12 rotates the disk 11. The head 13 includes a read head element and a write head element, and it reads data from the disk 11 and writes data into the same.

The actuator 14 has a suspension with the head 13 mounted thereon, an arm, and a voice coil motor (VCM), and it moves the head in a radial direction on the disk 11.

The motor driver 15 has an SPM driver that supplies a drive current to the SPM 12 and a VCM driver that supplies a drive current to the VCM of the actuator 14.

The head amplifier 16 amplifies a signal (read data) read out by the head 13 and transmits this signal to the disk controller 20 through the R/W channel 17. Furthermore, the head amplifier 16 converts a signal (write data) output from the disk controller 20 through the R/W channel 17 into a write current and transmits this current to the head 13.

The R/W channel 17 is a signal processing circuit for reading and writing data, and it has a function of decoding read data read out by the head 13 and encoding write data.

The flash memory 18 is a nonvolatile memory that is controlled by the disk controller 20 to save data. It is to be noted that the flash memory 18 may store data in the system area 11a on behalf of the system area 11a.

The buffer memory 19 is a volatile memory such as a DRAM, and it is controlled by the disk controller 20 to temporarily store the read data and the write data. It is to be noted that the buffer memory 19 may be utilized to store data in the static RAM 25 on behalf of the static RAM 25.

The disk controller 20 is an interface that uses the buffer memory 19 to control data transmission between the R/W channel 17 and the host device 30A. Further, the disk controller 20 controls data read and write operations through the R/W channel 17 and also controls encryption processing, decryption processing, and others. In this embodiment, the disk controller 20 further controls device authentication processing and user authentication processing. The user authentication processing in this example includes processing other than conventional password authentication (e.g., destruction of the encryption key in case of an authentication failure).

A function block used for control over the device authentication processing, the user authentication processing, the encryption processing, and the decryption processing in particular in the control performed by the disk controller 20 will be described hereinafter.

The disk controller 20 includes the device authentication module 21, the user authentication module 22, the encryption module 23, the decryption module 24, and the static RAM 25.

The device authentication module 21 has a device authenticating function of executing device authentication based on second device authentication information received from the newly connected current host device 30A (or 30B, . . . ) and first device authentication information in the system area 11a and discarding the internal information G in the system area 11a if this device authentication has failed.

Furthermore, the device authentication module 21 has a third partial key writing function of combining a second partial key received from the current host device 30A (or 30B, . . . ) with the internal information G (a first partial key) in the system area 11a after the device authentication and writing a general third partial key K3 into the static RAM 25.

The user authentication module 22 has a user authenticating function of executing user authentication based on second user authentication information received from the current host device 30A (or 30B, . . . ) and first user authentication information in the system area 11a after writing the third partial key K3 by the device authentication module 21.

Moreover, the user authentication module 22 may have a key discarding function of discarding the internal information G in the system area IIa and the third partial key in the static RAM 25 if the user authentication has failed for a specified number of times. Additionally, the user authentication module 22 may have an error output function of outputting a user authentication error to the current host device 30A (or 30B, . . . ) without operating the encryption module 23 and the decryption module 24 if the user authentication has failed for a specified number of times in place of the key discarding function. In this embodiment, an example of using the key discarding function will be described.

Further, the user authentication module 22 has an encryption key writing function of combining the third partial key in the static RAM 25 with the second user authentication information to generate an encryption key after the user authentication and writing the generated encryption key into the static RAM 25.

The encryption module 23 has an encrypting function of encrypting data D in a write request based on an encryption key Kg in the static RAM 25 in response to the write request including the data D received from the current host device 30A (or 30B, . . . ) and writing obtained encrypted data Eg(Kg, D) into the user area 11b if the user authentication has succeeded.

The decryption module 24 has a decrypting function of decrypting the encrypted data in the user area 11b based on the encryption key in the static RAM 25 to obtain data and outputting this data to the current host device 30A (or 30B, . . . ) in response to a read request received from the current host device 30A (or 30B, . . . ) if the user authentication has succeeded.

The static RAM 25 is a volatile memory from/into which data can be read out/written from the respective modules 21 to 24, the intrinsic information "AA" as the second partial key and the internal information G as the first partial key are temporarily stored before generating the third partial key K3, and the intrinsic information "AA" and the internal information G are erased and the third partial key K3 is temporarily written when generating the third partial key K3. Likewise, when generating the encryption key Kg, the second user authentication information to be combined is temporarily stored, the third partial key K3 and the second user authentication information are erased, and the encryption key Kg is written. It is to be noted that the word "written" means "set". Furthermore, the encryption key Kg is erased from the static RAM 25 when turning off the power supply of the memory device 10. Moreover, the temporary storage of the inherent information "AA", the internal information G, the third partial key K3, and the second user authentication information and the storage of the encryption key Kg until the power supply OFF may be executed by the buffer memory 19 in place of the static RAM 25. Additionally, the second partial key is not restricted to the intrinsic information "AA" in the host device 30A, and arbitrary data managed by the legitimate host device 30A can be used.

On the other hand, the host device 30A is a regular computer that is utilized by a user who has an access right and can be connected to the memory device 10.

Specifically, the host device 30A includes an interface 31, a memory 32A, an input module 33, a CPU 34, and an output module 35. It is to be noted that the host device 30A and the later-described other host device 30B have substantially the same configuration, except for the stored contents in the memory 32A. Therefore, a symbol "A" is provided to the memory 32A alone in the respective elements 31 to 35.

The interface 31 is a module configured to connect the memory device 10 to the host device 30A. For ease of explanation, a description that data is transmitted to the memory device 10 through the interface 31 will be omitted in the following.

The memory 32A is a memory unit from/into which data can be read and written by the input module 33, the CPU 34, and the output module 35, and it stores, e.g., the second partial key, the second device authentication information, a device authentication program, a user authentication program, and an application program as shown in FIG. 4. Further, the memory 32A appropriately stores data that is being processed or has been processed in accordance with execution of each program.

Here, the second partial key is key data constituting the other part of the encryption key generated by the memory device 10. As the second partial key, for example, the intrinsic information "AA" of a user's own device (the host device 30A), but the present invention is not restricted to this example. The second partial key will be described as the intrinsic information "AA" in the following explanation.

The second device authentication information is utilized by the memory device 10 to authenticate the legitimate host device 30A having connection authority with respect to the memory device 10, and device authentication information adopting an arbitrary device authentication system can be utilized.

The device authentication program is executed by the CPU 34, and it allows the host device 30A to operate as a device authentication information transmission module that transmits the second device authentication information in the memory 32A to the memory device 10 in accordance with a specified authentication sequence for the device authentication executed by the device authentication module 21 of the memory device 10 when connected with the memory device 10.

The user authentication program is executed by the CPU 34, and it allows the host device 30A to operate as a user authentication information transmission module that transmits second user authentication information received by the input module 33 to the memory device 10.

The application program is an arbitrary program executed by the CPU 34, and it allows the host device 30A to operate as a read request transmission module that transmits a read request accepted by the input module 33 to the memory device 10, for example.

In addition, the application program may allow the host device 30A to operate as a write request transmission module that transmits an accepted write request to the memory device 10, for example.

Furthermore, the application module may allow the host device 30A to operate as a module that reads data from the memory device 10 and a module that executes operation processing based on the read data and writes a processing result into the memory device 10, for example.

The input module 33 is an input interface between a user and the device, and it is operated as, e.g., a user authentication information acceptance module that accepts input of the second user authentication information and a read request acceptance module that accepts input of the read request. Moreover, the input module may be operated as a write request acceptance module that accepts input of the write request including data in accordance with an operation of the user. As the input module, for example, an input device such as a keyboard or a mouse can be appropriately used.

The CPU 34 is an arithmetic processing unit that executes each program in the memory 32A based on data in the memory 32A.

The output module 35 is an output interface between the user and the device and, for example, an output device such as a display device can be appropriately used.

Figure 5:
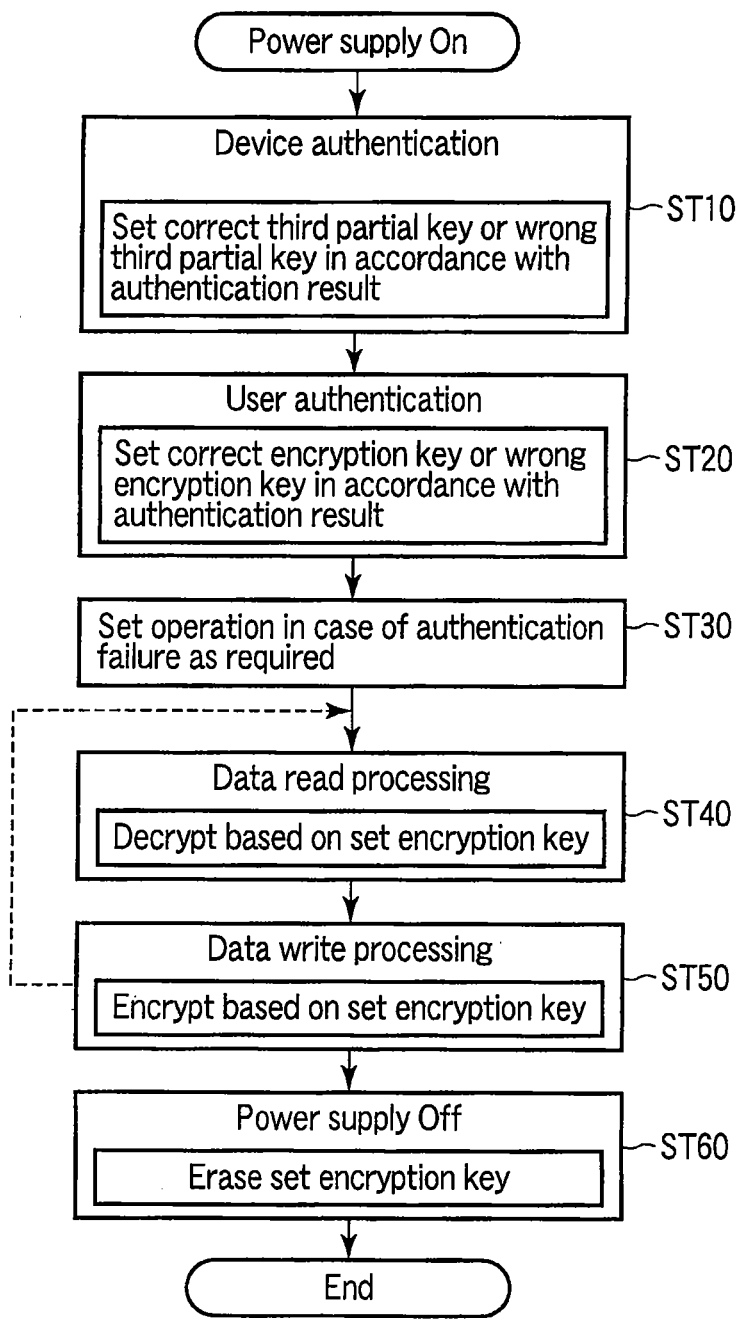
FIG. 5 is an exemplary flowchart for explaining an operation in the first embodiment.

An operation of the memory system having the above-described configuration will now be described with reference to flowcharts of FIG. 5 and FIG. 6. It is to be noted that the memory device 10 is assumed to store the encrypted data Eg(Kg, D). Additionally, it is assumed that, in the host device 30A, the CPU 34 is executing the device authentication program, the user authentication program, and the application program in the memory 32A.

It is assumed that a proper user connects the memory device 10 to the legitimate host device 30A and turns on the power supply. As a result, the memory device 10 executes the device authentication with respect to the host device 30A (ST10).

Specifically, when the memory device 10 is connected, the CPU 34 in the host device 30A transmits the second device authentication information in the memory 32A to the memory device 10 in accordance with the specified authentication sequence for the device authentication.

The device authentication module 21 in the memory device 10 executes the device authentication based on the second device authentication information received from the newly connected current host device 30A and the first device authentication information in the system area 11a. The device authentication module 21 destroys the internal information G in the system area 11a to provide internal information I when the device authentication has failed, but it is assumed that the device authentication has succeeded in this example.

The device authentication module 21 combines the intrinsic information "AA" received from the current host device 30A with the internal information G in the system area 11a after the device authentication and writes a generated third partial key K3 into the static RAM 25. This third partial key K3 is a correct partial key. It is to be noted that, if the device authentication has failed, a wrong partial key K3i including the destroyed internal information I is written.

In any case, the device authentication of the block ST10 is completed by writing the encryption key.

Subsequently, the memory device 10 executes user authentication with respect to the host device 30A (ST20).

Specifically, the input module 33 in the host device 30A accepts input of the second user authentication information in accordance with an operation of the user. The CPU 34 transmits the accepted second user authentication information to the memory device 10.

The user authentication module 22 in the memory device 10 executes the user authentication based on the second user authentication information received from the current host device 30A and the first user authentication information in the system area 11a. Here, it is assumed that the user authentication has succeeded.

The user authentication module 22 combines the third partial key in the static RAM 25 with the second user authentication information after the user authentication and writes a generated encryption key into the static RAM 25.

It is to be noted that, if the user authentication has failed, a wrong encryption key is written into the static RAM 25 by the key discarding function of the user authentication module 22 like the example where the device authentication has failed.

As a result, the user authentication of the block ST20 is completed.

After the user authentication, the memory device 10 advances to blocks ST30 to ST50 in accordance with an operation of the host device 30A by the user. An example where blocks ST40 to ST50 are carried out without executing a setting operation at the time of the authentication failure in the block ST30 will be described.

The input module 33 in the host device 30A accepts input of a read request in accordance with an operation of the user. The CPU 34 transmits the accepted read request to the memory device 10.

The decryption module 24 in the memory device 10 decrypts the encrypted data Eg(Kg, D) in the user area 11b based on the encryption key Kg in the static RAM 25 in response to a read request received from the current host device 30A and outputs obtained data D to the current host device 30A (ST40). As a result, the block ST40 is completed.

Figure 6:
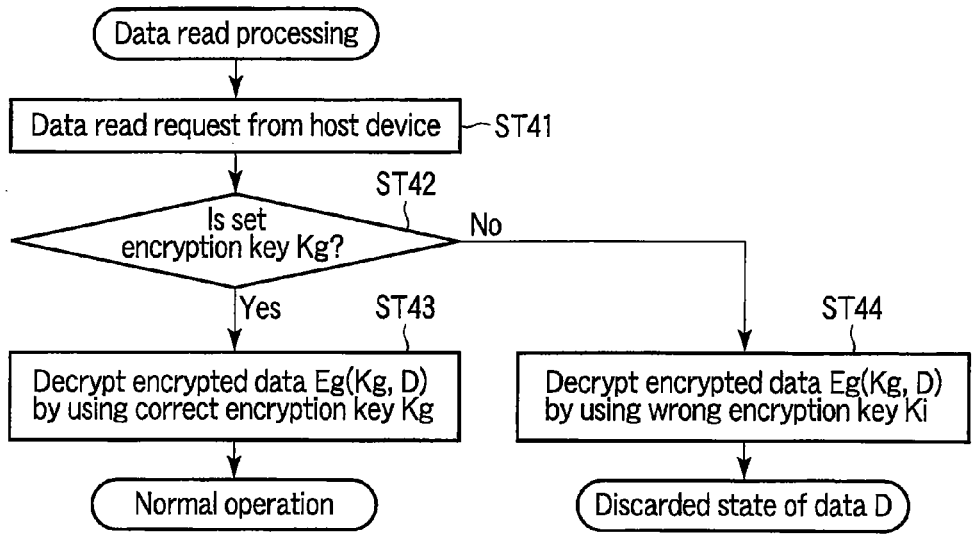
FIG. 6 is an exemplary flowchart for explaining read processing in the first embodiment.

It is to be noted that, in the data read processing in the block ST40, as shown in FIG. 6, when the encrypted data Eg(Kg, D) is decrypted by using the correct encryption key Kg (ST41 to ST43), correct data D is output, and a normal operation is realized. Furthermore, when the encrypted data Eg(Kg, D) is decrypted by using a wrong encryption key Ki (ST41, ST42, ST44), wrong data Di is output, and the correct data D is destroyed.

Then, the input module 33 in the host device 30A accepts input of a write request including data D1 in accordance with an operation of the user, for example. The CPU 34 transmits the accepted write request to the memory device 10.

The encryption module 23 in the memory device 10 encrypts the data D1 in the write request based on the encryption key Kg in the static RAM 25 in accordance with the write request including the data D1 received from the current host device 30A, and it writes obtained encrypted data Eg(Kg, D1) into the user area 11b (ST50). As a result, the block ST50 is completed. As a result, the block ST50 is completed.

In the memory device 10, the read processing in the block ST40 and the write processing in the block ST50 are appropriately and repeatedly executed in accordance with an operation of the host device 30A by the user.

Then, in the memory device 10, the power supply is turned off by an operation of the user (ST60). Consequently, in the memory device 10, data in the buffer memory 19 and the static RAM 25 is erased. At this time, the encryption key in the static RAM 25 is also erased.

As described above, according to this embodiment, the host devices 30A, 30B, . . . are subjected to device authentication, and the internal information G (the first partial key) is destroyed to discard the encryption key when the device authentication has failed, thereby avoiding data leakage when the device is taken out to a different system.

Further, after the internal information G is destroyed to discard the encryption key Kg, even if the memory device 10 is again connected to the legitimate host device 30A, the encryption key Kg cannot be restored since there is no internal information G, and hence the correct data D cannot be read out. As a result, the data D can be assuredly destroyed when the memory device 10 is stolen, and the data leakage can be avoided.

Furthermore, adopting the configuration that the encryption key is discarded when the user authentication has failed enables destroying the data D before the password P of the user is analyzed when the device is stolen.

Moreover, storing the encryption key in the static RAM 25 (the volatile memory) at the time of turning on the power supply enables assuredly discarding the encryption key at the time of turning off the power supply.

Second Embodiment

A second embodiment will now be described with reference to FIG. 1.

Figure 7:
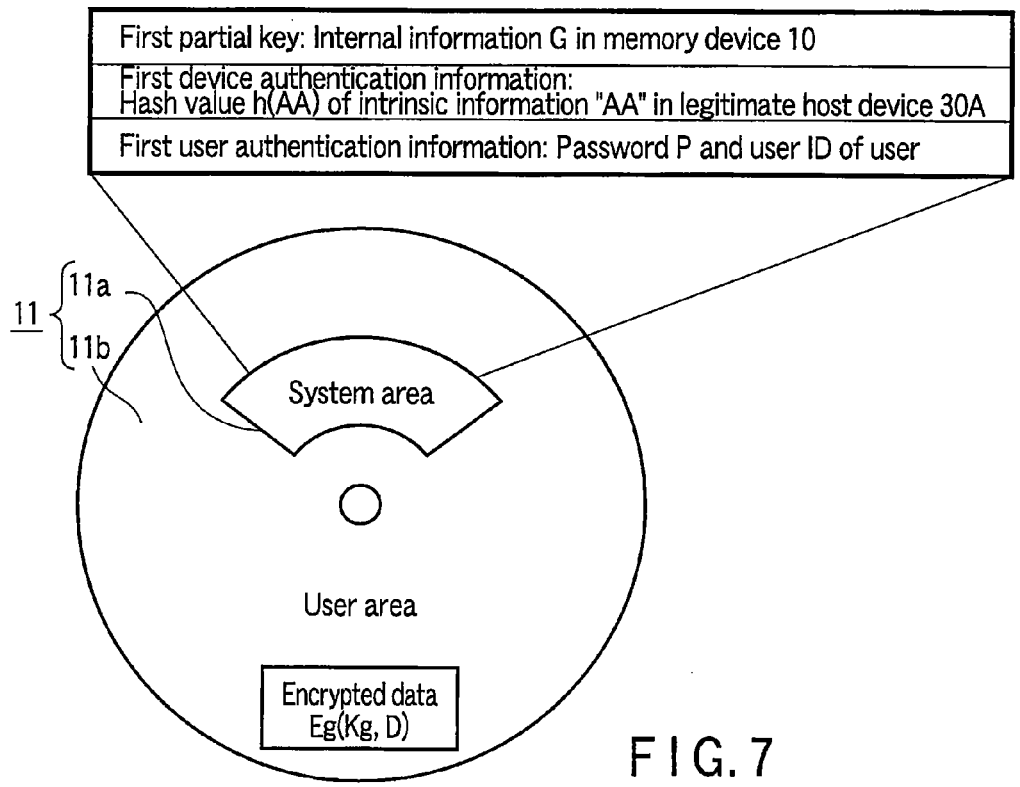
FIG. 7 is an exemplary schematic view for explaining data in a disk in a second embodiment.

The second embodiment is a specific example of the first and second device authentication information in the first embodiment. That is, the first device authentication information is a hash value h (AA) of the intrinsic information "AA" of the legitimate host device 30A as shown in FIG. 7.

Figure 8:
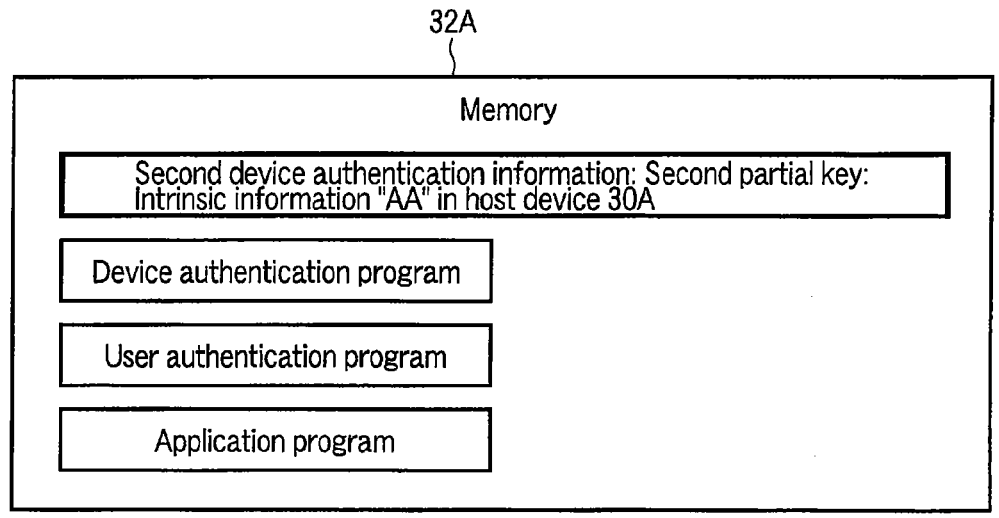
FIG. 8 is an exemplary schematic view for explaining data in a memory in the second embodiment.

The second device authentication information is the intrinsic information "AA" of the current host device 30A that is also used as the second partial key as shown in FIG. 8. The second partial key is the intrinsic information "AA" of the current host device 30A that is also used as the second device authentication information.

Therefore, the device authentication module 21 in the memory device 10 has a function of calculating the hash value h(AA) of the second device authentication information "AA" received from the current host device 30A, collating this hash value h(AA) with the first device authentication information h(AA) in the system area 11a, and determining that the device authentication has failed when both the values do not coincide with each other.

An operation of the thus configured memory system will now be described with reference to flowcharts in FIG. 9 and FIG. 10.

It is assumed that the device authentication in the block ST10 now begins.

When the memory device 10 is connected, the CPU 34 in the host device 30A transmits the intrinsic information "AA" in the memory 32A to the memory device 10 in accordance with the specified authentication sequence of the device authentication.

The device authentication module 21 in the memory device 10 receives the intrinsic information "AA" of the newly connected current host device 30A (ST11). It is to be noted that, if the improper host device 30B is connected, the device authentication module 21 receives intrinsic information "BB".

The device authentication module 21 calculates the hash value h(AA) of the received intrinsic information "AA", collates this hash value h(AA) with the hash value h(AA) of the intrinsic information "AA" in the system area 11a (ST12), and judges whether both the values coincide with each other (ST13).

When the judgment result of the block ST13 represents mismatch, the device authentication module 21 judges whether the system area 11a has another previously held hash value (ST14), and it returns to the block ST12 to retry the collation processing by using another hash value if such a hash value is present. Processing is performed to this block ST14 when the plurality of connectable legitimate host devices 30A, . . . are present, and hence this processing can be omitted when the single legitimate host device 30A alone is present.

Furthermore, when the judgment result of the block ST14 represents absence, the device authentication module 21 discards the encryption key (ST15). Specifically, as shown in FIG. 10, the device authentication module 21 discards the proper internal information G in the system area 11a (ST15-1) and newly creates internal information I such as a random number (ST15-2). Moreover, the device authentication module 21 destroys the hash value of the intrinsic information "AA" in the system area 11a (ST15-3) and creates a hash value of intrinsic information "BB" received in the block ST11 (ST15-4). It is to be noted that the third partial key K3 is discarded when the internal information G constituting the third partial key K3 is discarded and the internal information I is newly created. Additionally, when the third partial key K3 is discarded, the encryption key Kg based on the third partial key K3 is discarded.

On the other hand, when the judgment result of the block ST13 represents match, the device authentication module 21 reads out the internal information G in the system area 11a (ST16). Then, the device authentication module 21 combines the intrinsic information "AA" received in the block ST11 with the internal information G read out in the block ST16 and writes a generated correct third partial key K3 into the static RAM 25 (ST17a).

It is to be noted that, when the third partial key K3 is discarded at the block ST15, the device authentication module 21 combines the intrinsic information "BB" received in the block ST11 with the internal information I created in the block ST15-2 and writes a generated wrong third partial key K3i into the static RAM 25 (ST17b).

In any case, the device authentication of the block ST10 is completed by writing the third partial key.

Like the first embodiment, blocks ST20 to ST60 are executed.

Next, an example where the legitimate host device 30A is connected during the operation of the second embodiment and an example where the improper host device 30B is connected during the same will be collaterally explained. Incidentally, an example of general password authentication will be first briefly explained.

FIG. 11 is a schematic view showing an operation of the memory system that executes the general password authentication alone. Reference numerals 1, 3A and 3B of each device in this system correspond to reference numerals 10, 30A and 30B of each device in this embodiment.

The memory device 1 stores a password P of a user, an encryption key K, and encrypted data E(K, D) obtained by encrypting data D by using the encryption key K.

In this memory device 1, when the correct password P is transmitted from any one of the legitimate host device 3A and the improper host device 3B, the encrypted data E(K, D) can be decrypted based on the encrypted key K, and the correct data D can be output.

Therefore, a malicious user having an access right can take out the memory device 1 from the legitimate host device 3A, connect it to the host device 3B at home, and correctly acquire the data D including confidential information and others.

Thus, it is desired that the correct data D can be read out from the memory device 1 only when the legitimate host device 3A is used and that the data D is destroyed when the host device 3B is used.

FIG. 12 is a schematic view showing an operation when the legitimate host device 30A is connected to the memory device 10 in the second embodiment, and FIG. 13 is a schematic view showing an operation when the improper host device 30B is connected to the memory device 10 in the second embodiment.

Figure 9:
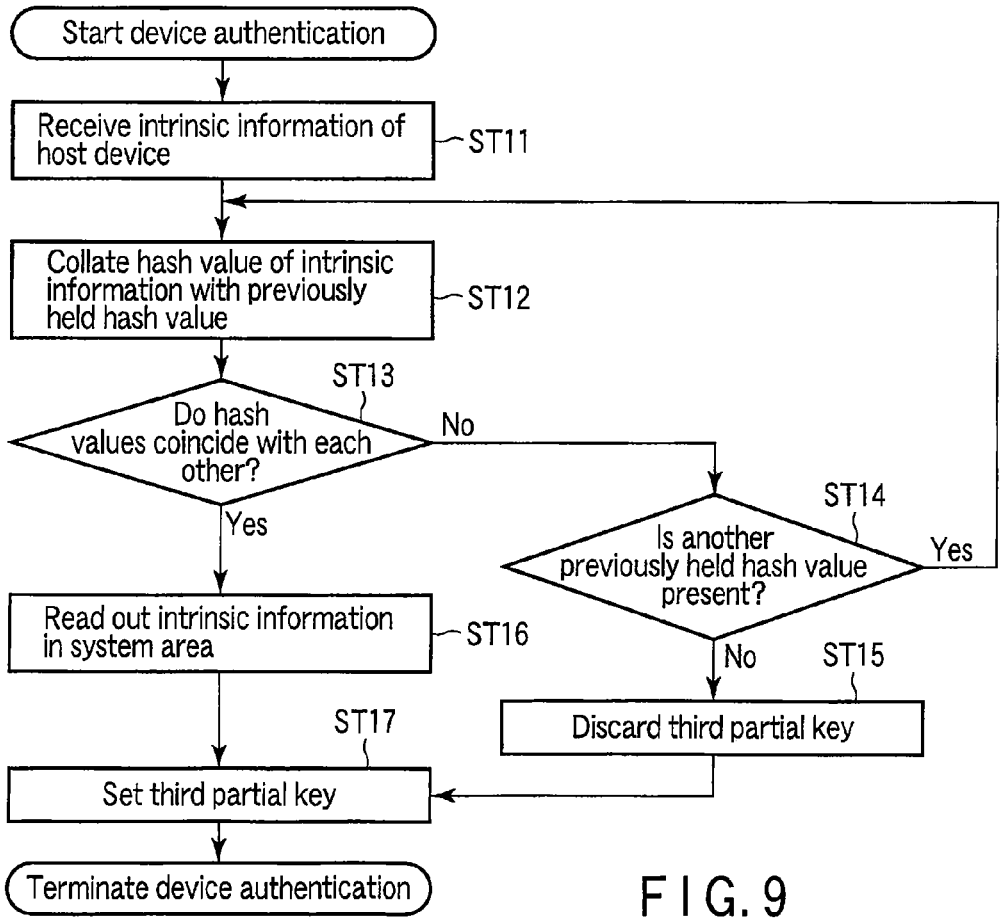
FIG. 9 is an exemplary flowchart for explaining an operation in the second embodiment.
Figure 10:
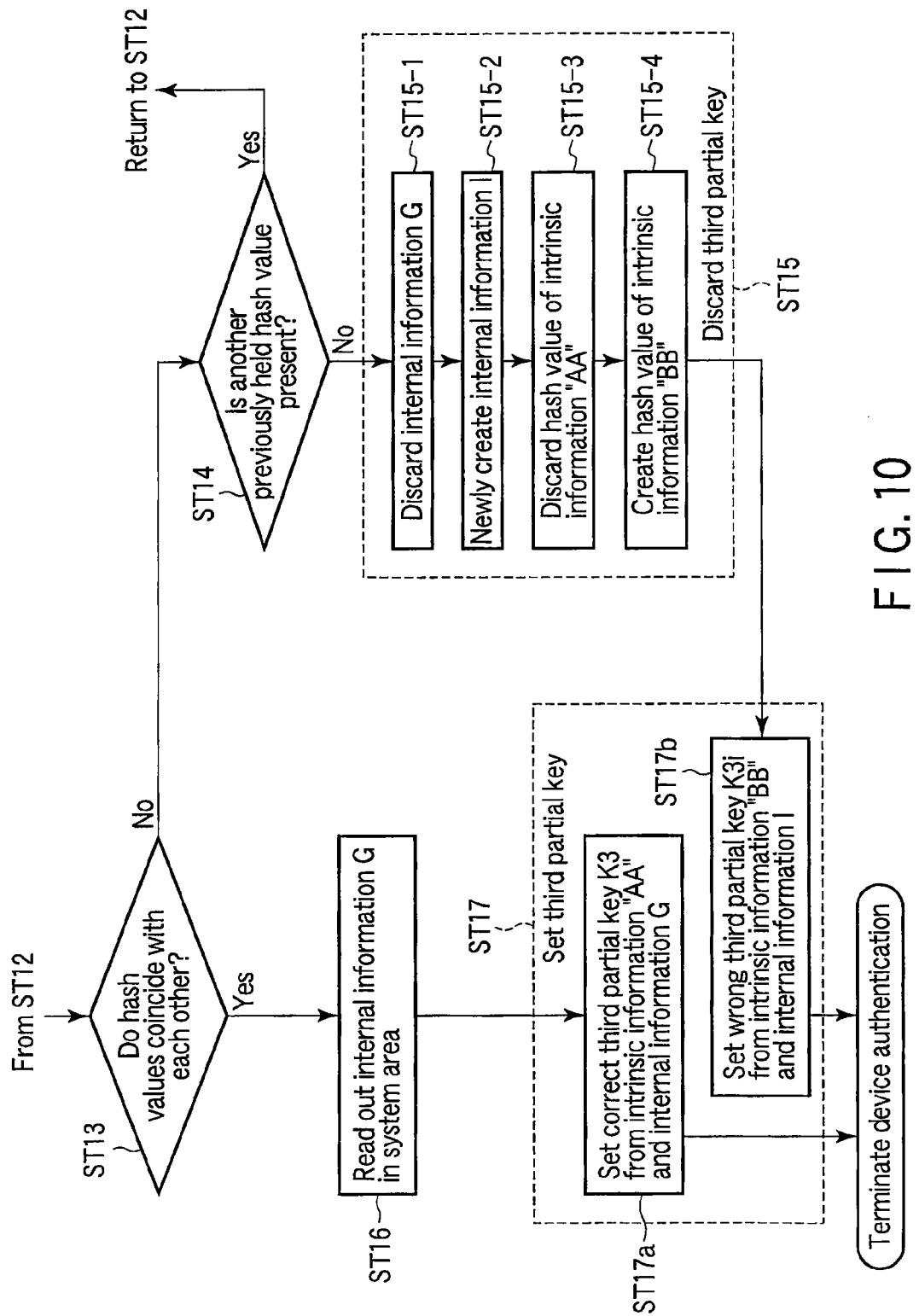
FIG. 10 is an exemplary flowchart for explaining an operation in the second embodiment.

When the operation shown in FIG. 9 is executed with the memory device 10 being connected to the legitimate host device 30A, a hash value h(AA) obtained by performing a hashing operation with respect to the intrinsic information "AA" transmitted by the host device 30A coincides with a hash value h(AA) previously held in the memory device 10. When the hash values h(AA) coincide with each other, the memory device 10 combines the received intrinsic information "AA" of the host device 30A with the internal information G to generate a third partial key K3. Further, the memory device 10 combines this third partial key K3 with second user authentication information and sets a generated encryption key Kg as a decryption key. When a read request of the data D is received from the host device 30A, the data D is correctly decrypted based on the set decryption key Kg and transmitted.

When the memory device 10 is taken out to the system of the improper host device 30B, a hash value h(BB) obtained by performing the hashing operation with respect to intrinsic information "BB" transmitted by the host device 30B does not coincide with the hash value h(AA) previously held in the memory device 10. Therefore, the memory device 10 destroys the internal information G and the previously held hash value h(AA), again newly generates internal information I based on, e.g., random number generation, creates a hash value of the intrinsic information "BB" of the host device 30B, and writes the created value into the system area 11a. At this time, the encryption key Kg is discarded.

When a read request for the data D is issued from the host device 30B, the memory device 10 combines the intrinsic information "BB" of the host device 30B with the internal information I, combines a generated third partial key K3i with the second user authentication information, and decrypts encrypted data Eg(Kg, D) by using a generated encrypted key Ki. In this decryption processing, since the wrong encryption key Ki is used, the correct data D cannot be read out.

Furthermore, since the encryption key Kg has been already discarded, the user cannot read out the correct data D even if the memory device 10 is again connected to the host device 30A.

As described above, according to this embodiment, even if the first embodiment is embodied and configured in such a manner that the first device authentication information is the hash value h(AA) of the intrinsic information "AA" of the legitimate host device 30A and the second device authentication information is the intrinsic information "AA" of the current host device 30A that is also used as the second partial key, the same effects as those of the first embodiment can be obtained.

Third Embodiment

A third embodiment will now be described with reference to FIG. 1.

The third embodiment is another embodiment of the first and second device authentication information in the first embodiment. That is, as shown in FIG. 14, the first device authentication information is a signature verification key Kveri-30A of a legitimate host device 30A.

Figure 15:
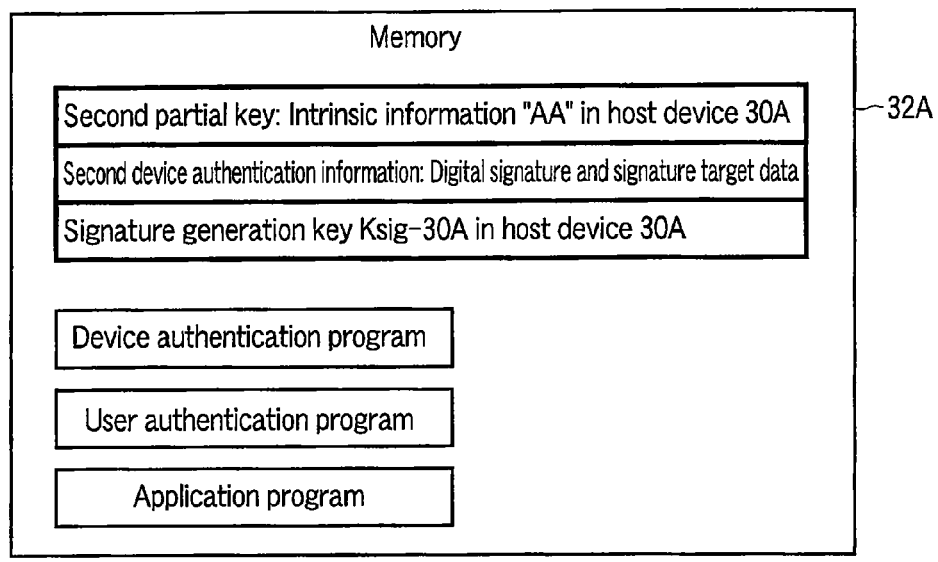
FIG. 15 is an exemplary schematic view for explaining data in a memory in the third embodiment.

As shown in FIG. 15, the second device authentication information is a digital signature generated based on a signature generation key Ksig-30A of the current host device 30A and signature target data used for generation of the digital signature. It is to be noted that the digital signature is generated by performing signature processing based on the signature generation key Ksig-30A with respect to a hash value calculated from signature target data. Thus, a memory 32A of the host device 30A stores the signature generation key Ksig-30A.

It is to be noted that, as the signature generation key Ksig-30A, a private key of a public key pair can be used. As the signature verification key Kveri-30A, a public key of the public key pair can be used. Therefore, the signature generation key Ksig-30A may be read as a private key, and the signature verification key Kveri-30A may be read as a public key. This can be also applied to a signature generation key Ksig-10 and a signature verification key Kveri-10 of a later-described memory device 10.

Further, a device authentication module 21 in the memory device 10 has a function of decrypting a digital signature in the second device authentication information based on the signature verification key Kveri-30A, collating obtained decrypted data with a hash value calculated from signature target data in the second device authentication information, and determining that device authentication has failed when these pieces of data do not coincide with each other.

Figure 16:
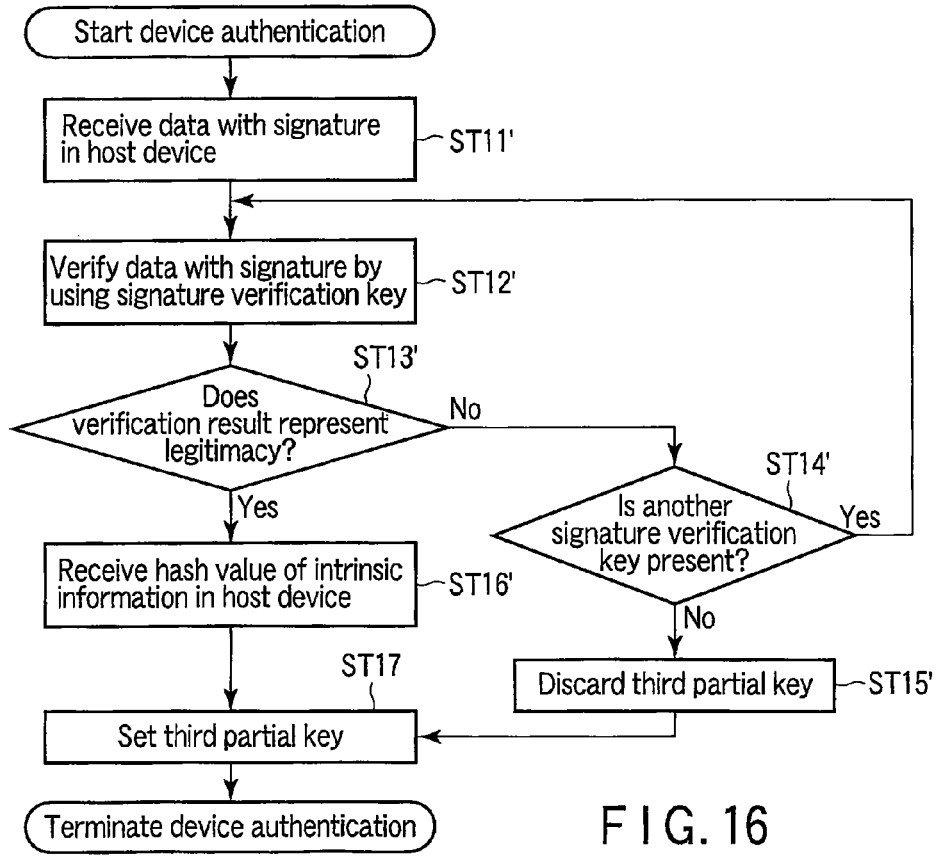
FIG. 16 is an exemplary flowchart for explaining an operation in the third embodiment.
Figure 17:
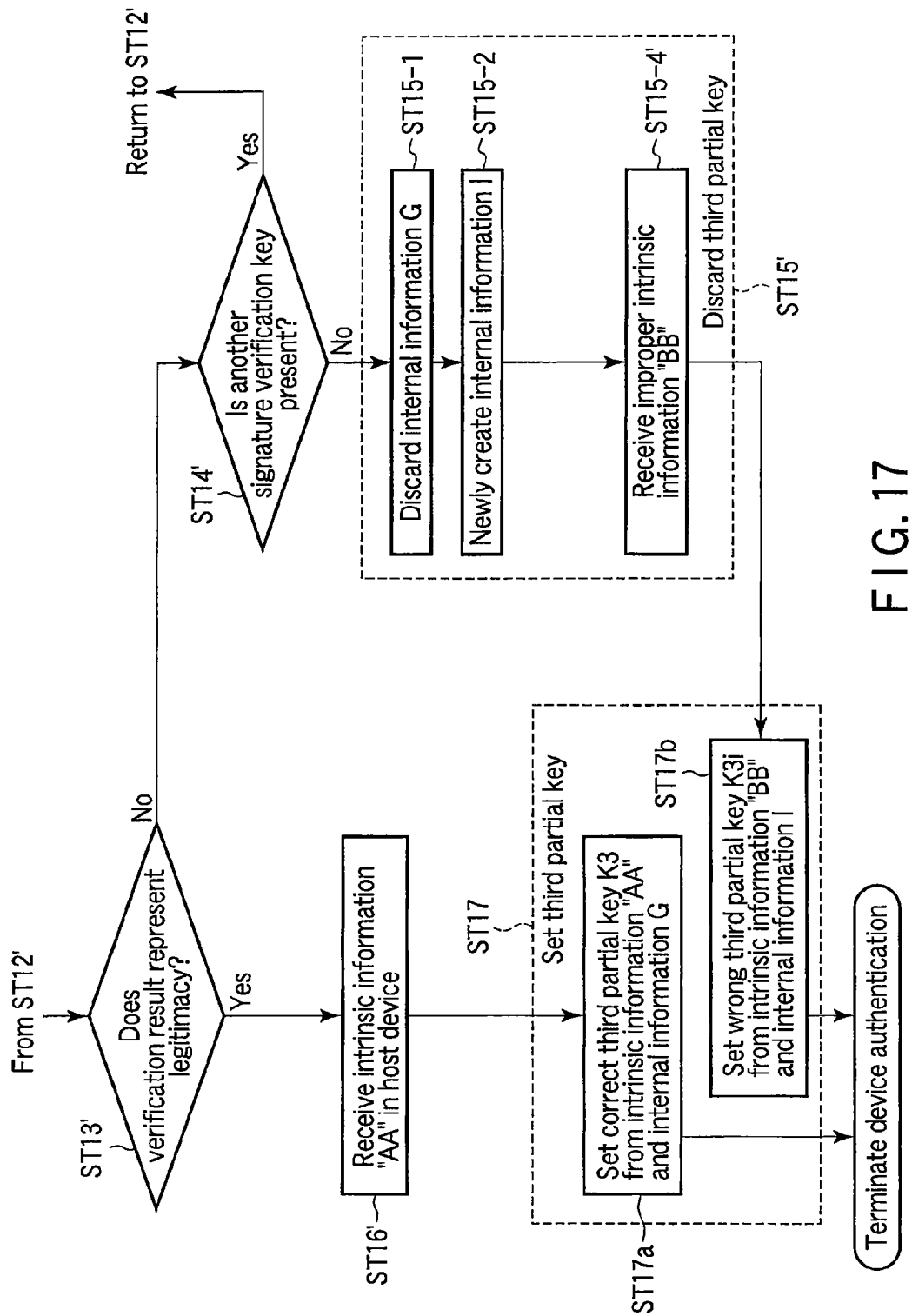
FIG. 17 is an exemplary flowchart for explaining an operation in the third embodiment.

An operation of the thus configured memory system will now be described with reference to flowcharts of FIG. 16 and FIG. 17.

It is assumed that the device authentication in the block ST10 begins.

When the memory device 10 is connected, a CPU 34 of the host device 30A generates signature target data such as a random number and calculates a hash value of this signature target data in accordance with a specified authentication sequence of the device authentication. Subsequently, the CPU 34 applies the signature processing to this hash value to generate a digital signature based on the signature generation key Ksig-30A in the memory 32A. Then, the CPU 34 writes data with a signature consisting of this signature target data and the digital signature into the memory 32A as the second device authentication information and transmits the data with the signature (the second device authentication information) to the memory device 10.

The device authentication module 21 in the memory device 10 receives the data with the signature of the newly connected current host device 30A (ST11'). It is to be noted that, in case of an authentication failure, the data with the signature has been received from the current host device 30A.

The device authentication module 21 verifies the data with the signature based on the signature verification key Kveri-30A in the system area 11a (ST12'). Specifically, the device authentication module 21 decrypts the digital signature in the received data with the signature based on the signature verification key Kveri-30A and collates obtained decoded data with a hash value calculated from signature target data in the second device authentication information to verify that these pieces of data coincide with each other.

The device authentication module 21 judges whether another previously held signature verification key Kveri is present in the system area 11a (ST14') if a verification result does not represent legitimacy (ST13'; no), or it returns to the block ST12' to retry the collation processing by using another signature verification key Kveri if another signature verification key Kveri is present. Since this block ST14' is processing when the plurality of connectable legitimate host devices 30A, . . . are present, it can be omitted when the number of the legitimate host devices 30A is one.

Furthermore, when a judgment result of the block 14' is a negative result, the device authentication module 21 discards a third partial key (ST15'). Specifically, as shown in FIG. 17, the device authentication module 21 destroys legitimate internal information G in the system area 11a (ST15-1) and newly generates internal information I such as a random number (ST15-2). Furthermore, the device authentication module 21 receives intrinsic information "BB" from a current host device 30B (ST15-4). It is to be noted that the third partial key K3 is discarded in the block ST15-1 to ST15-2 as described above, and hence an encryption key Kg is discarded.

On the other hand, if the verification result of the block ST12' represents legitimacy (ST13'; yes), the device authentication module 21 receives intrinsic information "AA" from the current host device 30A (ST16'). Then, the device authentication module 21 writes the correct third partial key K3 into a static RAM 25 as described above (ST17a).

It is to be noted that, when the third partial key K3 has been discarded in the block ST15, the device authentication module 21 writes a wrong third partial key K3i into the static RAM 25 as described above (ST17b).

In any case, writing the encryption key terminates the device authentication in the block ST10.

Subsequently, blocks ST20 to ST60 are executed like the first embodiment.

As described above, according to this embodiment, even if the first embodiment is carried out in such a manner that the first device authentication information is the signature verification key Kveri-30A of the legitimate host device 30A and the second device authentication information is the digital signature and the signature target data of the host device 30A, the same effects as those of the first embodiment can be obtained.

Moreover, this embodiment is not restricted to the signature authentication, and it may adopt authentication using transmission/reception of one-time information based on a challenge & response system. This type of authentication may be executed like [1] to [3] mentioned below, for example.

[1] The device authentication module 21 generates a random number r, performs encryption processing to this random number r by using the signature verification key Kveri-30A (a public key of the host device 30A), and transmits an obtained value C (=r^Kveri-30A) to the host device 30A (or 30B, . . . ) (^ is a symbol representing exponentiation).

[2] The host device 30A (or 30B, . . . ) performs decryption processing to this value C by using the signature generation key Ksig-30A (a private key of the host device 30A) and returns an obtained value t=(C^Ksig-30A) to the device authentication module 21.

[3] The device authentication module 21 determines that the device authentication is successful when the generated random number r coincides with the returned value t (when r=t).

Fourth Embodiment

A fourth embodiment will now be described with reference to FIG. 1 explained above.

The fourth embodiment is another specific example of the device authentication in each of the first to third embodiments.

That is, a device authentication module 21 in a memory device 10 has a function of determining that device authentication is a failure when it was detected that an authentication sequence at the time of transmitting second device authentication information by a current host device 30A (or 30B, . . . ) is different from a specified authentication sequence in addition to the above-described function.

Figure 18:
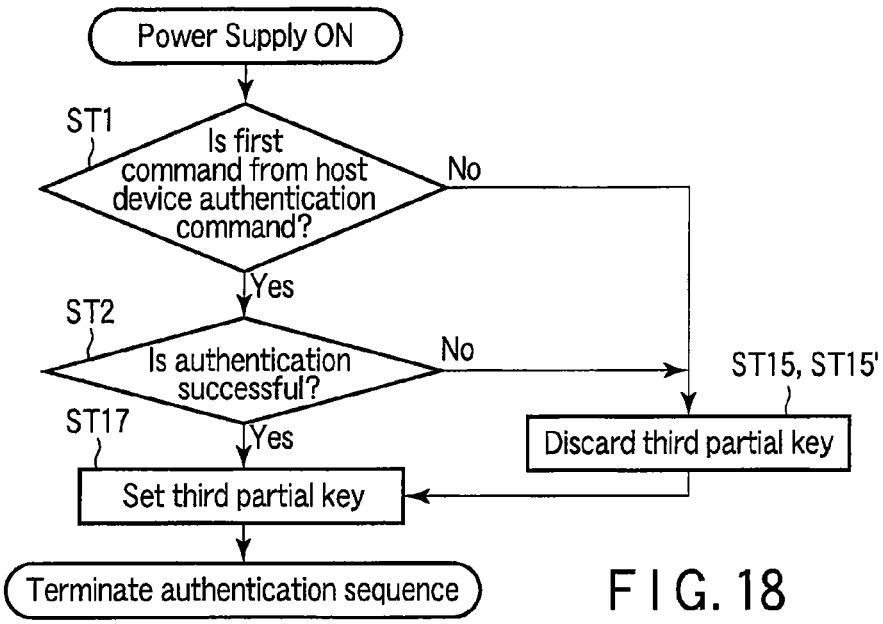
FIG. 18 is an exemplary flowchart for explaining an operation in a fourth embodiment.

An operation of the thus configured memory system will now be described with reference to a flowchart in FIG. 18.

It is assumed that the device authentication of the block ST10 begins.

When the memory device 10 is connected, a CPU 34 of the host device 30A transmits an authentication command and then transmits second device authentication information to the memory device 10 in accordance with a specified authentication sequence of the device authentication.

The device authentication module 21 in the memory device 10 judges whether the first command received from the newly connected current host device 30A (or 30B, . . . ) is the authentication command (ST1).

When a result of the judgment in the block ST1 is a negative result, the device authentication module 21 detects that the authentication sequence is different from the specified authentication sequence, determines that the device authentication has failed, and advances to a block ST15 (or ST15').

When the first command is the authentication command as a result of the judgment in the block ST1, the device authentication module 21 advances to a block ST2 to execute the device authentication. Here, the device authentication in the block ST2 is processing obtained by excluding discard of the third partial key and setting of the third partial key in the block ST10 (the device authentication) in each embodiment. For example, in the second embodiment, the blocks ST11 to ST14 and ST16 shown in FIG. 9 correspond to the block ST2 depicted in FIG. 18. In case of the third embodiment, the blocks ST11' to ST14' and ST16' shown in FIG. 16 correspond to the block ST2 depicted in FIG. 18.

The device authentication module 21 advances to a block ST17 if the device authentication in the block ST2 has succeeded, and it advances to the block ST17 through a block ST15 (or ST15') if the device authentication has failed.

In any case, the device authentication in the block ST10 is completed by writing the third partial key in the block ST17.

Like the first to third embodiments, blocks ST20 to ST60 are executed.

As described above, according to this embodiment, even if each of the first to third embodiment is carried out in such a manner that the device authentication module 21 determines that the device authentication has failed when it detects that the authentication sequence at the time of transmitting the second device authentication information by the current host device 30A (or 30B) is different from the specified authentication sequence, the same effects as those of each of the first to third embodiment can be obtained.

Furthermore, since the host device that can use the memory device 10 is restricted to the host device 30A having the authentication sequence equal to the authentication sequence of the memory device 10, data D can be destroyed when the memory device 10 is stolen, thereby avoiding data leakage.

Fifth Embodiment

A fifth embodiment will now be described with reference to FIG. 1.

The fifth embodiment is another specific example of the device authentication in each of the first to fourth embodiment.

Figure 19:
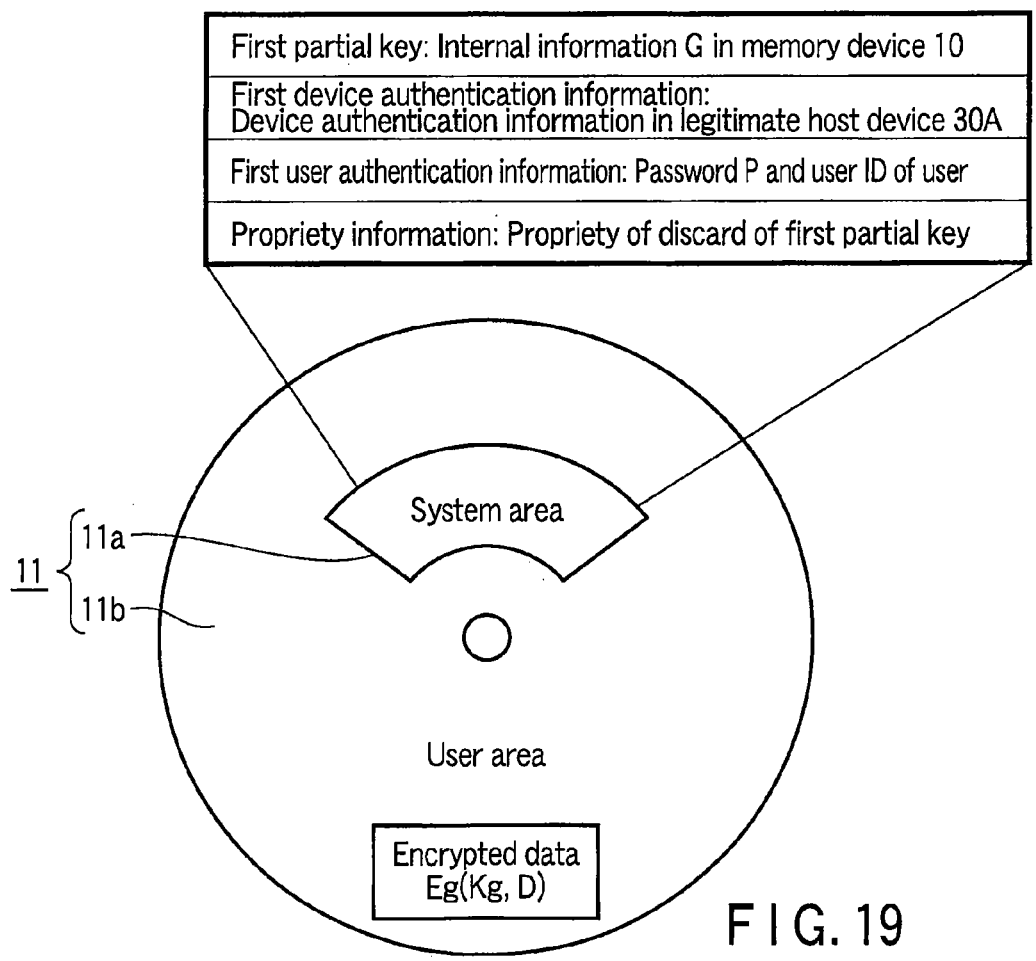
FIG. 19 is an exemplary schematic view for explaining data in a disk in a fifth embodiment.

That is, as shown in FIG. 19, a system area 11*a* of a memory device 10 stores propriety information indicating whether a first partial key is to be discarded in addition to each information described above.

A device authentication module 21 has a setting function of setting propriety information in the system area 11*a* upon receiving a setting request including the propriety information from a legitimate host device 30A in addition to each function described above. It is to be noted that the term "set" also means "write".

Moreover, the device authentication module 21 has a discard avoiding function of avoiding discard of the first partial key (internal information G) based on the propriety information in the system area 11*a* when the device authentication has failed. Supplementarily, it avoids discard when the propriety information is set to avoiding discard.

Additionally, the device authentication module 21 has an error output function of outputting a device authentication error to the current host device 30A (or 30B, . . . ) without operating the third partial key writing function, the user authentication module 22, and the decryption module 24 when the discard of the first partial key is avoided.

On the other hand, an input module 33 in the host device 30A has a setting request accepting function of accepting input of a setting request including propriety information in addition to the above-described function.

A CPU 34 in the host device 30A has a setting request transmitting function of transmitting the accepted setting request to the memory device 10 in addition to the above-described function.

An operation of the thus configured memory system will now be described with reference to a flowchart in FIG. 20.

A description will be first given as to operation setting at the time of an authentication failure in a block ST30 after the device authentication in the block ST10' and the user authentication in the block ST20 have succeeded by the legitimate host device 30A and a proper user.

The input module 33 in the host device 30A accepts input of a setting request including propriety information in accordance with an operation of the user. The CPU 34 in the host device 30A transmits the accepted setting request to the memory device 10.

When the device authentication module 21 in the memory device 10 receives the setting request including the propriety information from the legitimate host device 30A, it sets this propriety information to the system area 11*a*.

As a result, the block ST30 is completed. Then, blocks ST40 to ST50 are appropriately executed, and a power supply is temporarily turned off to terminate the operation (ST60). The propriety information is not erased even after turning off the power supply, and it is stored in the system area 11*a*.

Subsequently, it is assumed that the memory device 10 is connected to the current host device 30B by the user and the power supply is turned on. As a result, the memory device 10 executes device authentication with respect to the host device 30B (ST10'). It is to be noted that the current host device 30B is assumed to be an improper device.

When the memory device 10 is connected, the CPU 34 in the host device 30B transmits the second device authentication information in the memory 32B to the memory device 10 in accordance with a specified authentication sequence for the device authentication.

The device authentication module 21 in the memory device 10 executes the device authentication based on second device authentication information received from the newly connected current host device 30B and first device authentication information in the system area 11*a*.

However, the device authentication with respect to the improper host device 30B fails. A time point that the device authentication fails is immediately before the block ST15 or ST15' in each of the second to third embodiments.

When the device authentication fails, the device authentication module 21 in the memory device 10 avoids discard of the first partial key (internal information G) based on the propriety information in the system area 11*a*.

Then, the device authentication module 21 outputs a device authentication error to the current host device 30B without operating the third partial key writing function, the user authentication module 22, and the decryption module 24 when discarding the first partial key is avoided.

As described above, according to this embodiment, based on the configuration enabling setting whether the first partial key is to be discarded based on the propriety information, the effects of each of the second to the fourth embodiments can be obtained when effecting the discard is set, and destruction of encrypted data can be avoided when preventing the discard is set.

Sixth Embodiment

A sixth embodiment will now be described with reference to FIG. 1.

A sixth embodiment is another specific example of the device authentication in the respective first to fourth embodiments. In other words, the sixth embodiment is a configuration using the number of times of allowable connection in place of the propriety information in the fifth embodiment.

Figure 21:
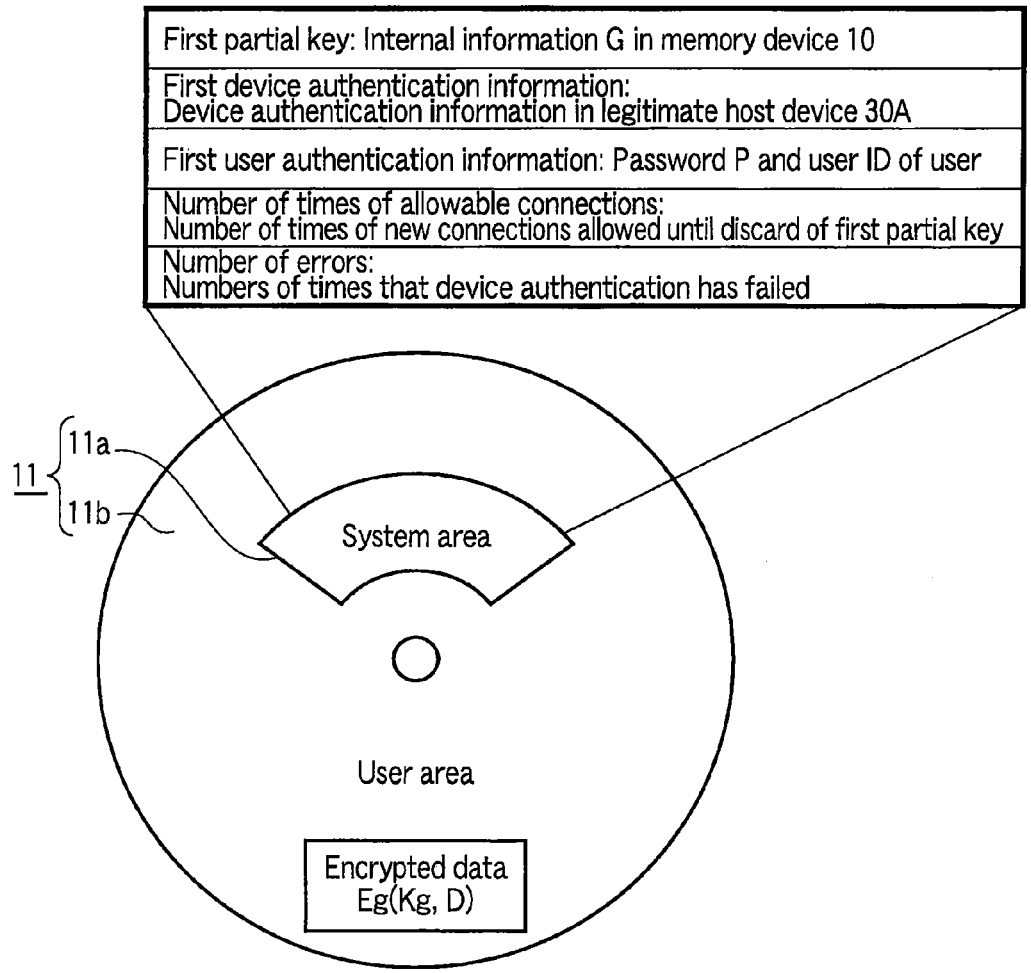
FIG. 21 is an exemplary schematic view for explaining data in a disk in a sixth embodiment.

That is, as shown in FIG. 21, a system area 11*a* in a memory device 10 stores the number of times of allowable connections (the number of times of possible retries) indicative of the number of times of new connections allowed until a first partial key is discarded and the number of errors indicative of the number of times that device authentication has failed in addition to each information mentioned above.

A device authentication module 21 has a setting function of setting the number of times of allowable connections in the system area 11*a* upon receiving a setting request including the number of times of allowable connections from a legitimate host device 30A in addition to each function described above.

Further, the device authentication module 21 has an error number updating function of updating the number of errors in the system area 11*a* to increase when the device authentication has failed.

Furthermore, the device authentication module 21 also has a discard avoiding function of avoiding discard of a first partial key (internal information G) based on the updated number of errors and the number of times of allowable connections in the system area 11*a*.

Moreover, the device authentication module 21 has an error output function of outputting a device authentication error to the current host device 30A (or 30B, ...) without operating the third partial key writing function, the user authentication module 22, and the decryption module 24 described above when discarding the first partial key is avoided.

On the other hand, an input module 33 of the host device 30A has a setting request accepting function of accepting input of a setting request including propriety information in accordance with an operation of a user in addition to the above-described functions.

A CPU 34 in the host device 30A has a setting request transmitting function of transmitting the accepted setting request to the memory device 10 in addition to the above-described function.

Figure 22:
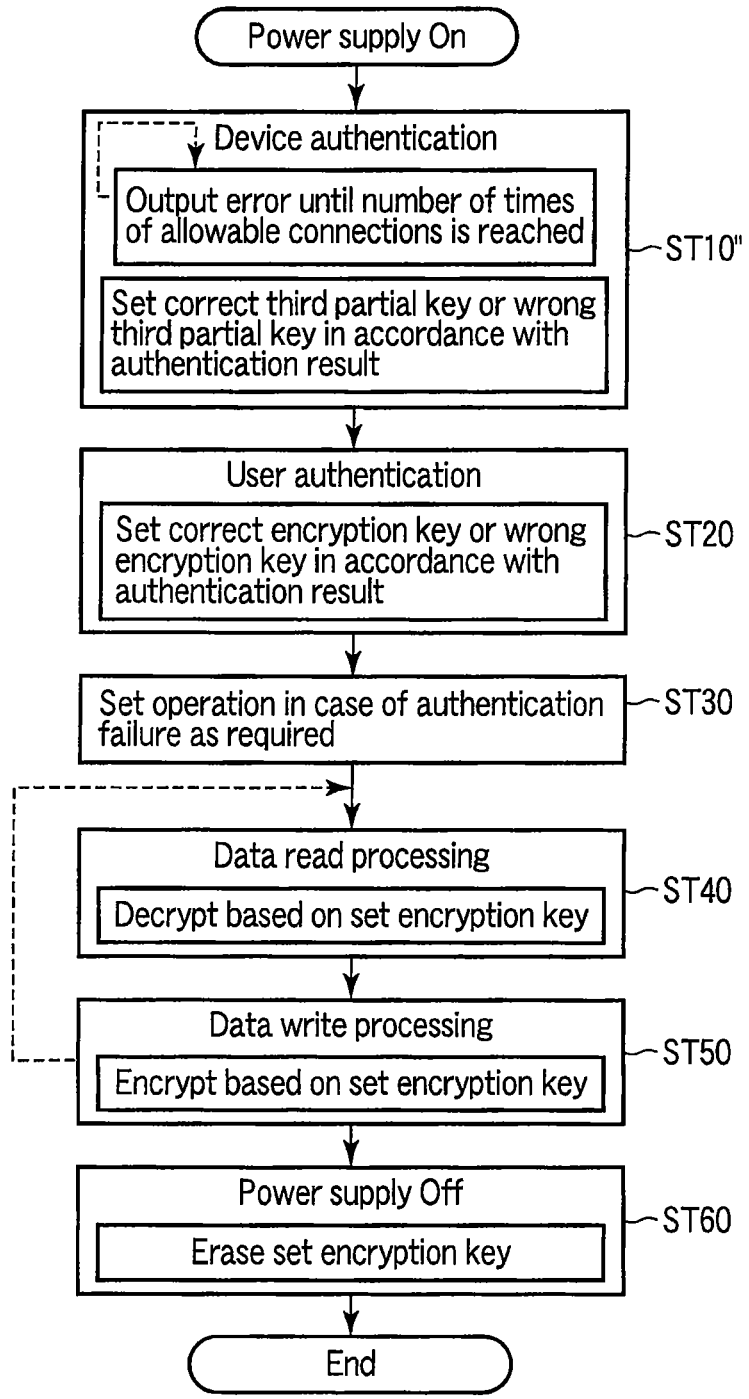
FIG. 22 is an exemplary flowchart for explaining an operation in the sixth embodiment.

An operation of the thus configured memory system will now be described with reference to a flowchart in FIG. 22.

First, the number of times of allowable connections is set in the system area 11a of the memory device 10 in operation setting at the time of an authentication failure in a block ST30 like the fifth embodiment. Thereafter, likewise, a power supply is temporarily turned off to terminate the operation (ST60). Even after the power supply is turned off, the number of times of allowable connections is not erased, and it is stored in the system area 11a.

Subsequently, it is assumed that the memory device 10 is connected to the current host device 30B and the power supply is turned on by the user. As a result, the memory device 10 executes device authentication for the host device 30B (ST10"). It is to be noted that the current host deice 30B is assumed to be an improper device.

Therefore, like the fifth embodiment, the device authentication for the improper host device 30B fails. A time point that the device authentication fails is immediately before the block ST15 or ST15' in each of the second to fourth embodiments.

When the device authentication has failed, the device authentication module 21 in the memory device 10 updates the number of errors in the system area 11a to increase and avoids discard of the first partial key (the internal information G) based on the updated number of errors and the number of times of allowable connections.

Then, the device authentication module 21 outputs a device authentication error to the current host device 30B without operating the third partial key writing function, the user authentication module 22, and the decryption module 24 described above when the discard of the first partial key is avoided.

As described above, according to this embodiment, based on the configuration that whether the first partial key is to be discarded can be set by using the number of times of allowable connections, destruction of encrypted data can be avoided until the number of times of allowable connections is reached, and the effects of each of the first to fourth embodiments can be obtained after the number of times of allowable connection is reached.

Seventh Embodiment

A seventh embodiment will now be described with reference to FIG. 1.

According to the seventh embodiment, discard log information when a first partial key is discarded is stored in each of the first to sixth embodiments.

Figure 23:
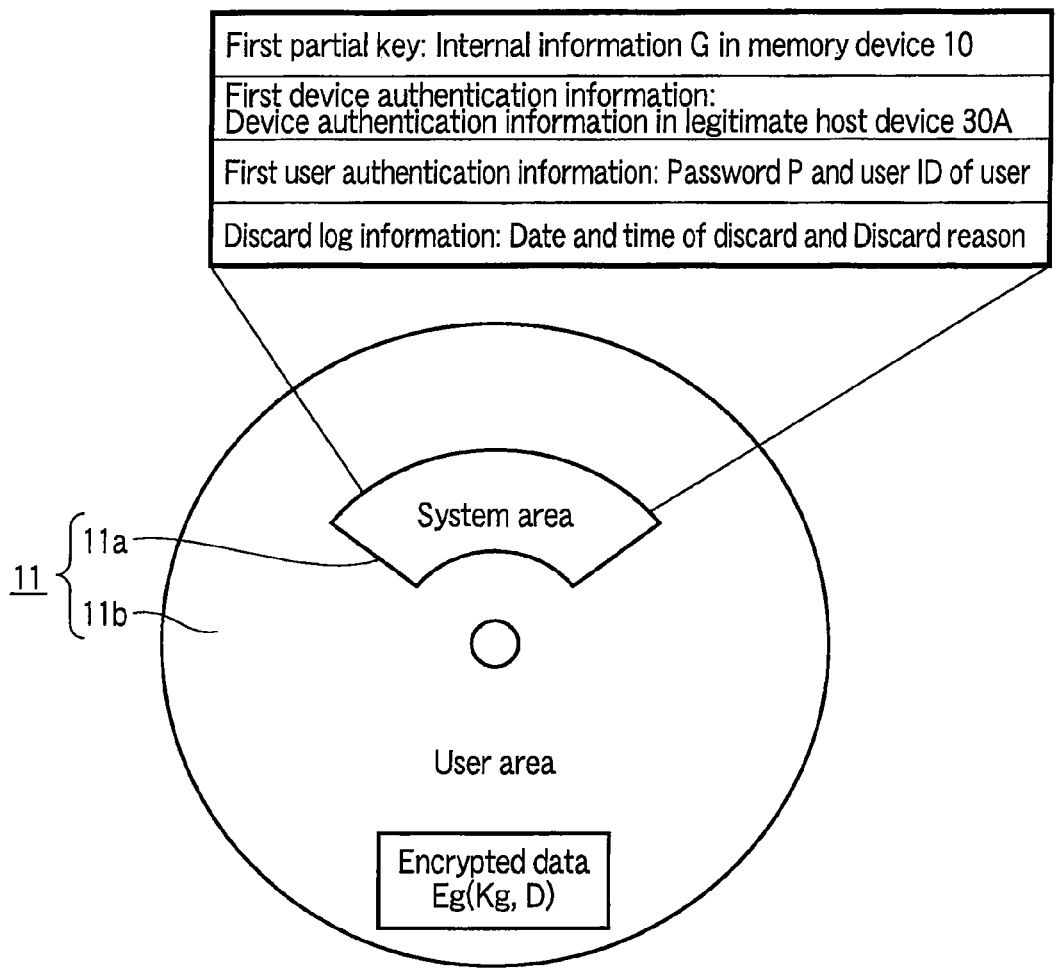
FIG. 23 is an exemplary schematic view for explaining data in a disk in a seventh embodiment.
Figure 24:
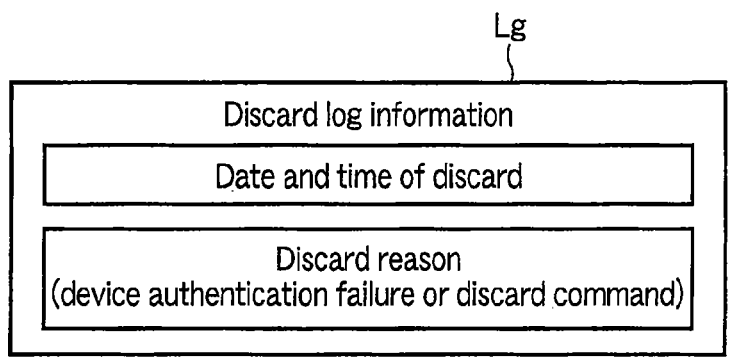
FIG. 24 is an exemplary schematic view for explaining discard log information in the seventh embodiment.

Specifically, as shown in FIG. 23 and FIG. 24, a system area 11a in a memory device 10 stores discard log information Lg including discarded date and time information indicative of a date and time when the first partial key is discarded and discard reason information indicative of a device authentication failure in addition to each information described above. It is to be noted that the discard reason information is not restricted to the device authentication failure and it may be indicative of discard based on a legitimate discard command when such a command is issued.

A device authentication module 21 has a discard log writing function of creating the discard log information Lg and writing it into the system area 11a when the first partial key is discarded in addition to each function described above. This discard log information Lg can be read out from the system area 11a in response to a read request from the legitimate host device 30A.

According to the above-described configuration, it is assumed that the device authentication fails and internal information G (the first partial key) is discarded as mentioned above. It is to be noted that a time point the discard is performed is, e.g., immediately after the block ST15 or ST15' in each of the second to fourth embodiments.

At this time, the device authentication module 21 creates the discard log information Lg including the discard date and time information indicative of a date and time that discard was performed and the discard reason information indicative of the device authentication failure and writes it into the system area 11a. As a result, for example, after the memory device 10 is collected from a site that the memory device 10 was stolen and brought to, the discard log information Lg is read out from the system area 11a in response to a read request from the legitimate host device 30A.

As described above, according to this embodiment, when the internal information G (the first partial key) is discarded, based on the configuration of storing the discard log information Lg, the effects of each of the first to sixth embodiments can be obtained, and a proper user can be aware of a date and time of discard and a discard reason.

Eighth Embodiment

An eighth embodiment will now be described with reference to FIG. 1.

The eighth embodiment is configured to store a discard certificate obtained by adding a digital signature to the discard log information Lg in the seventh embodiment.

Figure 25:
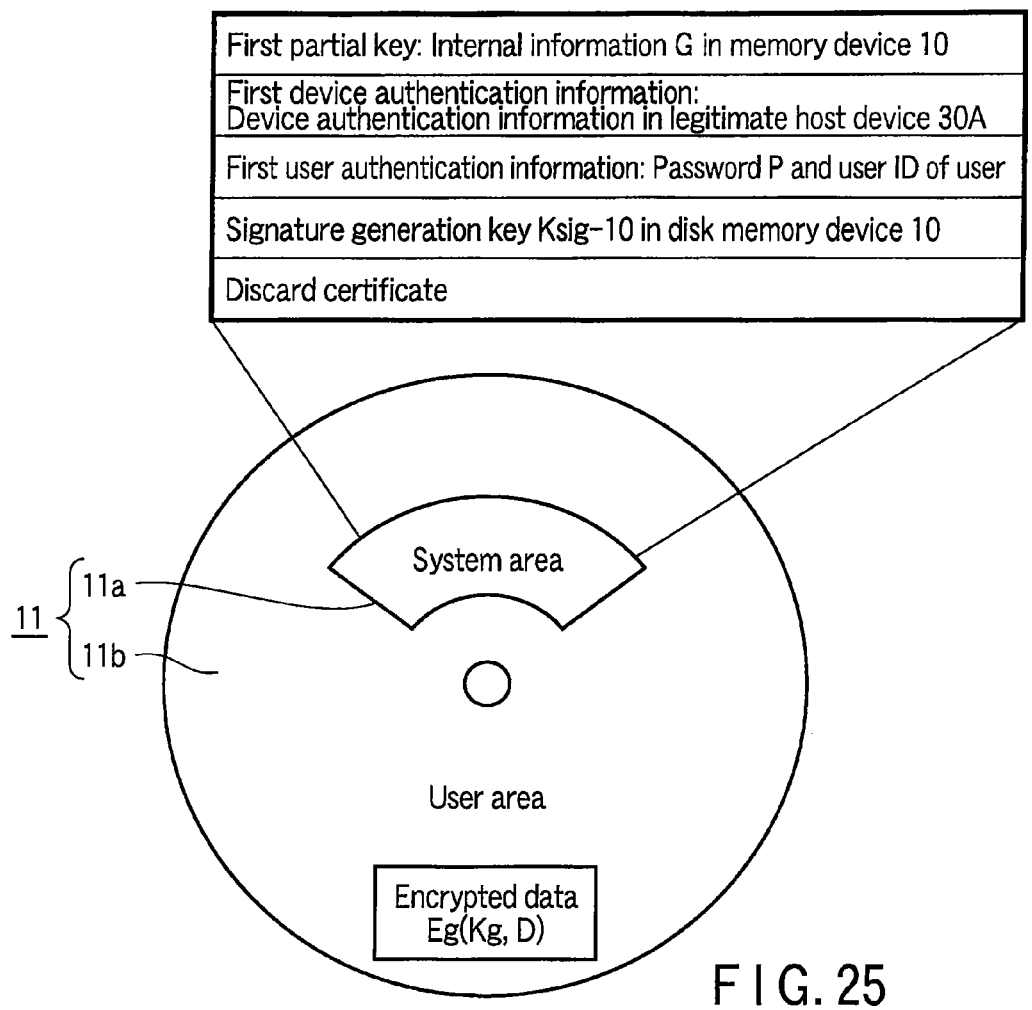
FIG. 25 is an exemplary schematic view for explaining data in a disk in an eighth embodiment.
Figure 26:
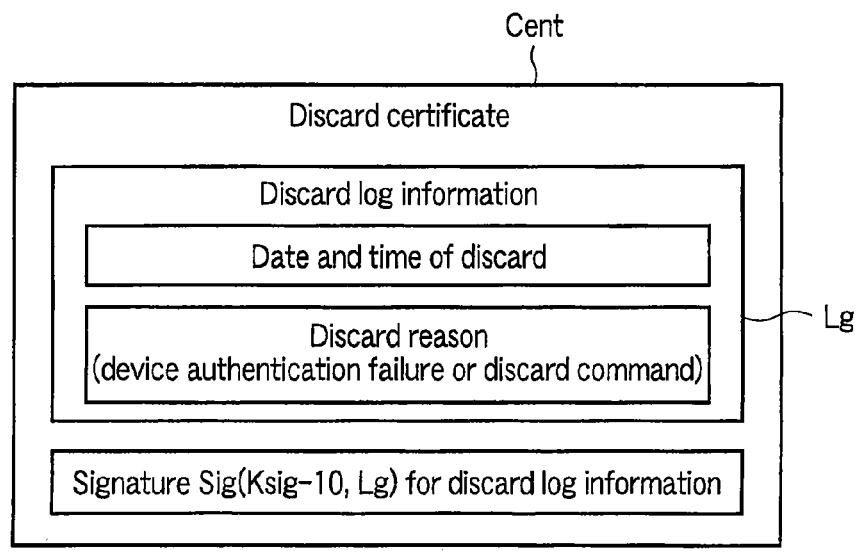
FIG. 26 is an exemplary schematic view for explaining discard certificate in the eighth embodiment.

Specifically, as shown in FIG. 25, a system area 11a in a memory device 10 previously stores a signature generation key Ksig-10 of a user's device in addition to each information described above. Here, as the signature generation key Ksig-10 of the user's device, it is possible to adopt not only a signature generation key of each memory device 10 (each serial number or model) but also a signature generation key of each manufacturer of the memory device 10 or a signature generation key of each vender of the memory device 10, for example. Additionally, the system area 11a stores a discard certificate Cert including the discard log information Lg and a digital signature as shown in FIG. 25 and FIG. 26.

The device authentication module 21 has a signature generating function of performing signature processing to the discard log information Lg in the system area 11a based on the signature generation key Ksig-10 in the system area 11a to generate a digital signature Sig(Ksig-10, Lg) in addition to each function described above.

Further, the device authentication module 21 also has a discard certificate creating function of creating the discard certificate Cert consisting of the discard log information Lg and the digital signature sig(Ksig-10, Lg) and writing this discard certificate Cert into the system area 11a.

This discard log certificate Cert can be read out from the system area 11a in response to a read request from a legitimate host device 30A like the above example.

Figure 27:
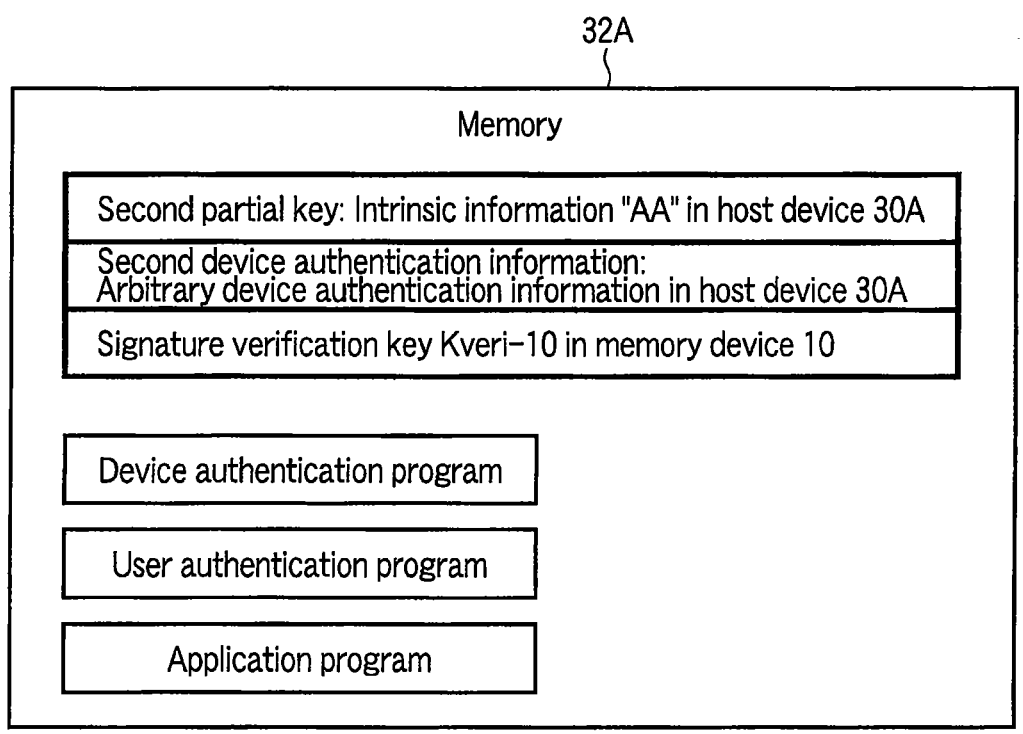
FIG. 27 is an exemplary schematic view for explaining data in a memory in the eighth embodiment.

On the other hand, as shown in FIG. 27, a memory 32a in the host device 30A previously stores a signature verification key Kveri-10 of the memory device 10 in addition to each information described above.

Furthermore, a CPU 34 in the host device 30A has a function of verifying the discard log certificate Cert read out from the memory device 10 in response to the read request based on the signature verification key Kveri-10 in the memory 32A in addition to the above-described functions.

According to the above-described configuration, when the discard log information Lg is written into the system area 11a in the seventh embodiment, the device authentication module 21 performs signature processing to the discard log information Lg in the system area 11a based on the signature generation key Ksig-10 in the system area 11a, thereby generating the digital signature Sig(Ksig-10, Lg).

Furthermore, the device authentication module 21 creates the discard certificate Cert consisting of the discard log information Lg and the digital signature Sig(Ksig-10, Lg) and writes this discard certificate Cert into the system area 11a. As a result, after the memory device 10 is recovered from a site that the memory device 10 was stolen and brought to, the discard certificate Cert is read out from the system area 11a in response to the read request from the legitimate host device 30A.

The CPU 34 in the legitimate host device 30A verifies the read discard log certificate Cert based on the signature verification key Kveri-10 in the memory 32A and outputs the discard certificate Cert to the output module 35 when a verification result represents legitimacy.

As described above, according to this embodiment, based on the configuration of storing the discard certificate Cert obtained by adding the digital signature to the discard log information Lg, the effects of the seventh embodiment can be obtained, and the legitimacy of the discard log information Lg can be verified.

Ninth Embodiment

A ninth embodiment will now be described with reference to FIG. 1.

The ninth embodiment is another specific example of the user authentication in each of the first to eighth embodiments.

That is, a user authentication module 22 in the memory device 10 has a function of determining a user authentication failure upon detecting that an authentication sequence when transmitting second user authentication information by a current host device 30A (or 30B, ...) is different from a specified authentication sequence in addition to each function described above. For example, the user authentication module 22 judges whether a first command received from the newly connected current host device 30A (or 30B, ...) is an authentication command, and it detects that the authentication sequence is different from the specified authentication sequence when a judgment results is a negative result.

According to the above-described configuration, since the user authentication module 22 is configured to determine a user authentication failure when the authentication sequence of the current host device 30A (or 30B, ...) is different from the specified authentication sequence, the effects of each of the first to eighth embodiments can be obtained, and fraudulence can be detected from a difference in authentication sequence for the user authentication even in case of the improper host device 30 that has successfully passed the device authentication.

Tenth Embodiment

A tenth embodiment will now be described with reference to FIG. 1.

According to the tenth embodiment, whether discard is to be performed at the time of a user authentication failure is set in each of the first to ninth embodiments.

Specifically, a system area 11a in a memory device 10 stores propriety information indicating whether a first partial key and a third partial key are to be discarded in addition to each information described above.

A user authentication module 22 has a setting function of setting propriety information in the system area 11a upon receiving a setting request including the propriety information from a legitimate host device 30A in addition to each function mentioned above.

Furthermore, the user authentication module 22 has a discard avoiding function of avoiding discard of the first partial key and the third partial key based on the propriety information in the system area 11a at the time of a user authentication failure.

Moreover, the user authentication module 22 has an error output function of outputting a user authentication error to the current host device 30A (or 30B, ...) without operating a decryption module 24 when the discard of the first partial key and the third partial key is avoided.

On the other hand, an input module 33 in the host device 30A has a setting request accepting function of accepting input of a setting request including propriety information in accordance with an operation of a user in addition to the above-described function.

A CPU 34 in the host device 30A has a setting request transmitting function of transmitting the accepted setting request to the memory device 10 in addition to the above-described function.

Figure 28:
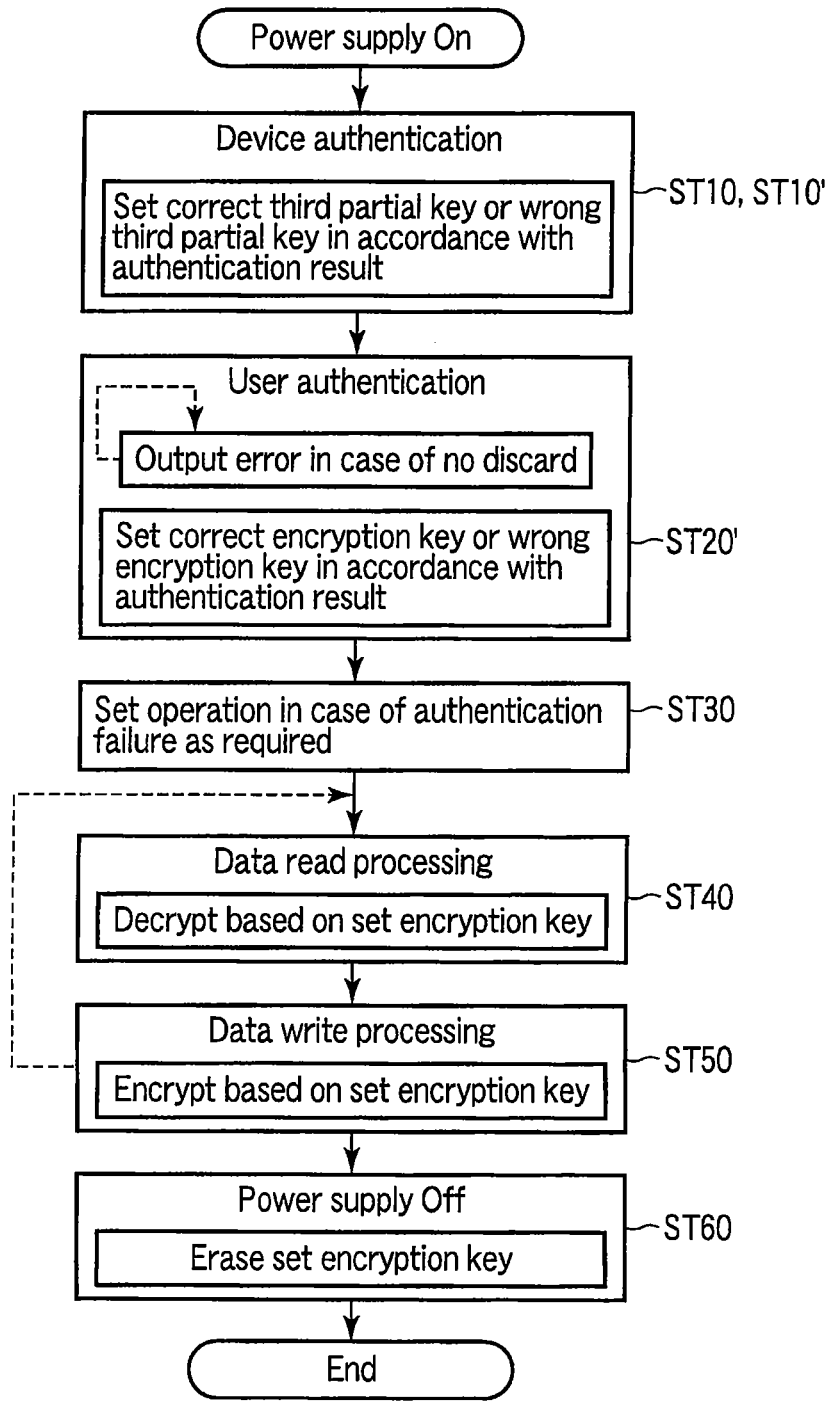
FIG. 28 is an exemplary flowchart for explaining an operation in a tenth embodiment.

An operation of the thus configured memory system will now be described with reference to a flowchart in FIG. 28.

First, like the fifth embodiment, the propriety information indicating whether discard is to be effected is set in the system area 11a in the memory device 10 in operation setting at the time of an authentication failure in a block ST30. Thereafter, likewise, a power supply is temporarily turned off to terminate the operation (ST60). The propriety information is not erased even after turning off the power supply, and it is stored in the system area 11a.

Subsequently, it is assumed that the memory device 10 is connected to the legitimate host device 30B by an improper user and the power supply is turned on. As a result, the memory device 10 executes device authentication for the host device 30A (ST10 or ST10'). It is to be noted that the device authentication succeeds since the host device 30A is legitimate.

Then, the memory device 10 executes user authentication for the host device 30A (ST20').

Specifically, an input module 33 in the host device 30A accepts input of improper second user authentication information in accordance with an operation of a malicious user. The CPU 34 transmits the accepted improper second user authentication information to the memory device 10.

The user authentication module 22 in the memory device 10 executes user authentication based on the improper second user authentication information received from the current host device 30A and first user authentication information in the system area 11a. Here, the user authentication for the malicious user fails.

When the user authentication has failed, the user authentication module 22 avoids discarding internal information G (the first partial key) in the system area 11a and the third partial key K3 in a static RAM 25 based on the propriety information in the system area 11a.

Additionally, the user authentication module 22 outputs a user authentication error to the current host device 30A without operating the decryption module 24 when the discard is avoided.

As described above, according to this embodiment, based on the configuration that whether the first partial key and an encryption key are to be discarded can be set based on the propriety information, the effects of each of the first to ninth embodiments can be obtained when effecting the discard is set, and the discard of encrypted data can be avoided when disabling the discard is set.

Eleventh Embodiment

An eleventh embodiment will now be described with reference to FIG. 1.

According to the eleventh embodiment, the number of times of allowing connections (the number of times of possible retries) at the time of a user authentication failure is set in the ninth embodiment. In other words, the eleventh embodiment has a configuration using the number of times of allowable connections in place of the propriety information in the tenth embodiment.

That is, a system area 11a in a memory device 10 stores the number of times of allowable connections indicative of the number of times of new connections allowed until a first partial key and a third partial key are discarded and the number of errors indicative of the number of times that user authentication has failed in addition to each information described above.

A user authentication module 22 has a setting function of setting the number of times of allowable connections in the system area 11a upon receiving a setting request including the number of times of allowable connections from a legitimate host device 30A in addition to each function described above.

Further, the user authentication module 22 has an error number updating function of updating the number of errors in the system area 11a to increase when the user authentication has failed.

Furthermore, the user authentication module 21 also has a discard avoiding function of avoiding discard of the first partial key (internal information G) and the third partial key based on the updated number of errors and the number of times of allowable connections in the system area 11a.

Moreover, the user authentication module 22 has an error output function of outputting a user authentication error to the current host device 30A (or 30B, . . . ) without operating a decryption module 24 when discarding the first partial key and the third partial key is avoided.

On the other hand, an input module 33 of the host device 30A has a setting request accepting function of accepting input of a setting request including propriety information in accordance with an operation of a user in addition to the above-described functions.

A CPU 34 in the host device 30A has a setting request transmitting function of transmitting the accepted setting request to the memory device 10 in addition to the above-described function.

According to the above-described configuration, since whether the first partial key and the third partial key are to be discarded can be set based on the number of times of allowable connections when the user authentication has failed, discarding encrypted data can be avoided until the number of times of allowable connection is reached, and the effects of the ninth embodiment can be obtained after reaching the number of times of allowable connections.

Twelfth Embodiment

A twelfth embodiment will now be described with reference to FIG. 1.

According to the twelfth embodiment, a user authentication module 22 stores discard log information at the time of discarding a first partial key and a third partial key in a system area 11a in each of the first to eleventh embodiments.

Here, like the above example, discard log information Lg includes discard date and time information indicative of a date and time that the first partial key and the third partial key were discarded and discard reason information indicative of a user authentication failure. It is to be noted that the discard reason information is not restricted to the user authentication failure and it may be indicative of discard based on a legitimate discard command when such a command is issued.

A user authentication module 22 has a discard log writing function of creating the discard log information Lg and writing it into the system area 11a when the first partial key and the third partial key are discarded in addition to each function described above. This discard log information Lg can be read out from the system area 11a in response to a read request from a legitimate host device 30A.

According to the above-described configuration, when the user authentication has failed and internal information G (the first partial key) and the third partial key K3 have been discarded, the user authentication module 22 creates the discard log information Lg including the discard date and time information indicative of a date and time of the discard and the discard reason information indicative of the user authentication failure and writes it into the system area 11a. As a result, for example, after the memory device 10 is recovered from a site that the memory device 10 was stolen and brought to, the discard log information Lg is read out from the system area 11a in response to a read request from the legitimate host device 30A.

As described above, according to this embodiment, when the internal information G (the first partial key) and the third partial key have been discarded, based on the configuration storing the discard log information Lg, the effects of each of the first to sixth embodiments can be obtained, and a proper user can be aware of a date and time of discard and a discard reason.

Thirteenth Embodiment

A thirteenth embodiment will now be described with reference to FIG. 1.

According to the thirteenth embodiment, a discard certificate obtained by adding a digital signature to the discard log information Lg in the twelfth embodiment is stored.

Specifically, like the eighth embodiment, as shown in FIG. 25, a system area 11a in a memory device 10 previously stores a signature generation key Ksig-10 of a user's device in addition to each information described above. Further, as shown in FIG. 25 and FIG. 26, the system area 11a stores a discard certificate Cert consisting of discard log information Lg and a digital signature.

A user authentication module 22 has a signature generating function of performing signature processing to the discard log information Lg in the system area 11a based on the signature generation key Ksig-10 in the system area 11a to generate a digital signature Sig(Ksig-10, Lg) in addition to each function described above.

Further, the user authentication module 22 also has a discard certificate creating function of creating the discard certificate Cert consisting of the discard log information Lg and the digital signature sig(Ksig-10, Lg) and writing this discard certificate Cert into the system area 11a.

This discard log certificate Cert can be read out from the system area 11a in response to a read request from a legitimate host device 30A like the above example.

On the other hand, the configuration of the host device 30A is equal to the eighth embodiment.

According to the configuration mentioned above, when the discard log information Lg has been written into the system area 11a in the twelfth embodiment, the user authentication module 22 performs the signature processing to the discard log information Lg in the system area 11a based on the signature generation key Ksig-10 in the system area 11a to generate the digital signature Sig(Ksig-10, Lg).

Furthermore, the user authentication module 21 creates the discard certificate Cert consisting of the discard log information Lg and the digital signature Sig(Ksig-10, Lg) and writes this discard certificate Cert into the system area 11a. As a result, after the memory device 10 is recovered from a site that the memory device 10 was stolen and brought to, the discard certificate Cert is read out from the system area 11a in response to a read request from the legitimate host device 30A.

A CPU 34 in the legitimate host device 30A verifies the read discard log certificate Cert based on the signature verification key Kveri-10 in the memory 32A and outputs the discard certificate Cert to an output module 35 when a verification result represents legitimacy.

As described above, according to this embodiment, based on the configuration that the user authentication module 22 stores in the system area 1a the discard certificate Cert obtained by adding the digital signature to the discard log information Lg, the effects of the twelfth embodiment can be obtained, and the legitimacy of the discard log information Lg can be verified.

According to at least one embodiment described above, based on the configuration that the memory device 10 includes the device authentication module 21 that executes the device authentication for the connected host device 30A (or 30B, . . . ) and discards the first partial key which is a part of an encryption key when the device authentication has failed, stored data can be nullified irrespective of presence/absence of an access right of a user when accessed from an environment different from the usable system environment.

<Modifications of Respective Embodiments>

In the respective first to thirteenth embodiments, the internal information G (the first partial key) in the memory device 10 and the intrinsic information "AA" (the second partial key) transmitted from the host device 30A are combined with each other, and the generated third partial key is combined with the second user authentication information to create an encryption key, and this encryption is stored in the static RAM 25 (the volatile memory).

Figure 29:
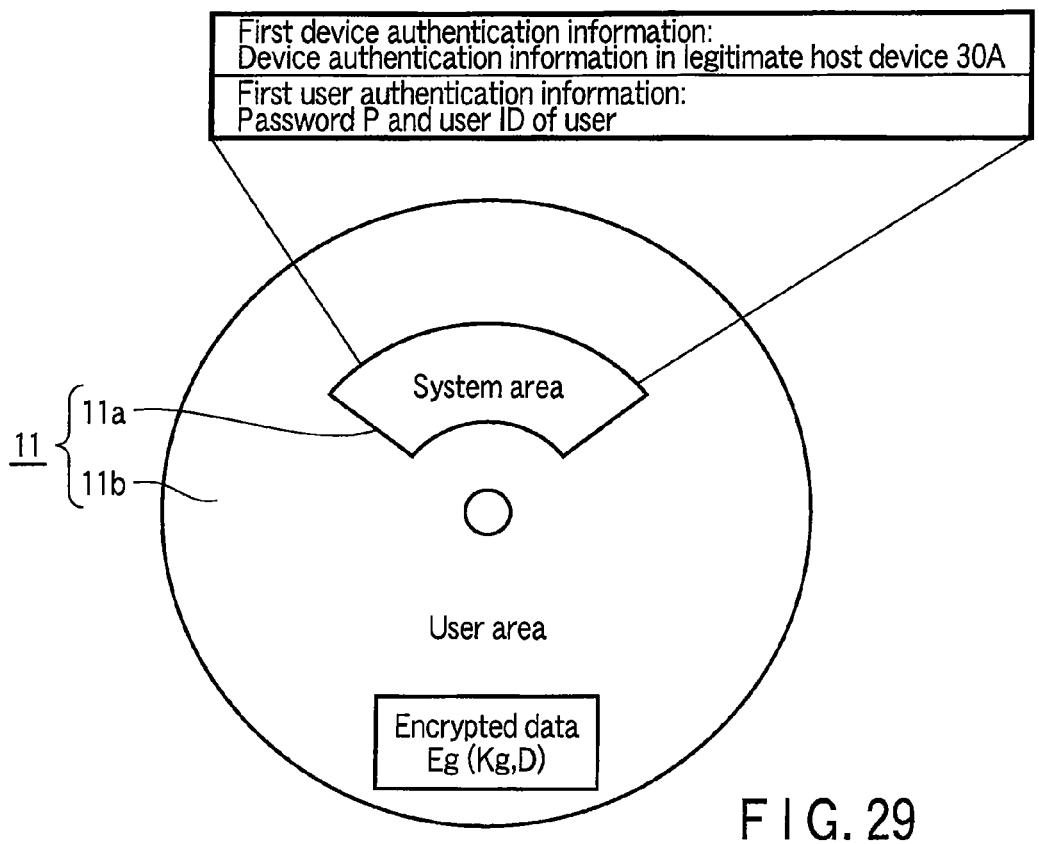
FIG. 29 is an exemplary schematic view for explaining data in a disk in a modification of the first embodiment.
Figure 30:
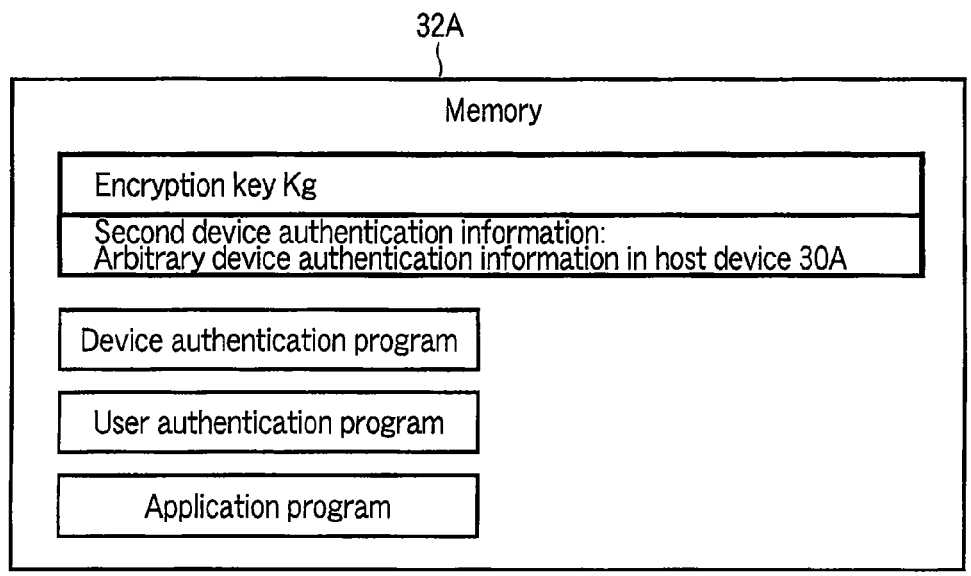
FIG. 30 is an exemplary schematic view for explaining data in a memory in the modification.

On the other hand, for example, as shown in FIG. 29 and FIG. 30, each of the first to thirteenth embodiments may be modified in such a manner that the first partial key in the system area 11a and the second partial key in the memory 32A are omitted and, on the other hand, the encryption key Kg is previously held in the memory 32A, and the device authentication module 21 writes the encryption key Kg transmitted from the host device 30A into the static key Kg when the device authentication has succeeded.

Here, a timing at which the host device 30A transmits the encryption key may be an arbitrary time point in the range after the success in the device authentication (after ST13; yes) and before the first block ST40 or ST50 using the encryption key, and it may be, e.g., immediately before the block ST17 where the third partial key is set. Further, the block ST15 or ST15' where the third partial key is discarded may be modified into a block for receiving the wrong encryption key from the host device 30B having failed in the device authentication, discarding the same, and generating a wrong encryption key such as a random number. In case of a device authentication failure, the wrong encryption key is written into the static RAM 25 in a block ST17b like the above example.

It is to be noted that FIG. 29 and FIG. 30 correspond to a modification of the first embodiment. Although not shown, in a modification of each of the second to thirteenth embodiments, likewise, the first partial key in the system area 11a and the second partial key in the memory 32A are omitted and, on the other hand, the encryption key Kg is previously held in the memory 32A.

The modifications will be sequentially described hereinafter.

<Modification of First Embodiment>

As shown in FIG. 29, the system area 11a in the memory device 10 stores the first device authentication information and the first user authentication information in advance.

The device authentication module 21 has a device authenticating function of executing the device authentication based on the second device authentication information received from the newly connected current host device 30A (or 30B, . . . ) and the first device authentication information in the system area 11a.

Furthermore, the device authentication module 21 has a first encryption key writing function of writing the encryption key Kg received from the current host device 30A into the static RAM 25 (the volatile memory) when this device authentication has succeeded.

Moreover, the device authentication module 21 has a second encryption key writing function of discarding the encryption key received from the current host device 30B, . . . and writing an encryption key different from this encryption key into the static RAM 25 when this device authentication has failed.

The user authentication module 22 has a user authenticating function of executing the user authentication based on second user authentication information received from the current host device 30A (or 30B, . . . ) and first user authentication information in the system area 11a after writing the encryption key by the device authentication module 21.

Additionally, the user authentication module 22 may have a key discarding function of discarding the encryption key Kg in the static RAM 25 when the user authentication has failed for a specified number of times. Further, the user authentication module 22 may have an error output function of outputting a user authentication error to the current host device 30A (or 30B, . . . ) without operating the encryption module 23 and the decryption module 24 when the user authentication has failed for a specified number of times in place of the key discarding function.

The encryption module 23 and the decryption module 24 are the same as those in the first embodiment.

The static RAM 25 is a volatile memory from/into which data can be read/written by the respective modules 21 to 24, and the device module 21 writes the encryption key into the static RAM 25. The encryption key is erased from the static RAM 25 when the power supply of the memory device 10 is turned off. It is to be noted that the buffer memory 19 may store the encryption key from a write operation to the power supply OFF in place of the static RAM 25.

On the other hand, as shown in FIG. 30, the memory 32A in the host device 30A stores the encryption key Kg in place of the second partial key. Here, the encryption key Kg is the encryption key Kg used for creating encrypted data Eg(Kg, D) stored in the user area 11b of the memory device 10. The encrypted data Eg(Kg, D) can be decrypted to obtain correct data D based on this encryption key Kg.

It is to be noted that the second device authentication information, the user authentication program, and the application program in the memory 32A are the same as those in the above example.

The device authentication program in the memory 32A is the same as that described above, and it is also operated as an encryption key transmission module that transmits the encryption key in the memory 32A to the memory device 10 in accordance with a specified authentication sequence of the device authentication executed by the device authentication module 21.

The input module 33, the CPU 34, and the output module 35 are equal to those described above.

As explained above, even if the device authentication module 21 is configured to write the encryption key Kg transmitted from the host device 30A into the static RAM 25 when the device authentication has succeeded, the encryption key is discarded when the device authentication has failed like the above example, and hence the same effects as those of the first embodiment can be obtained.

<Modification of Second Embodiment>

Figure 31:
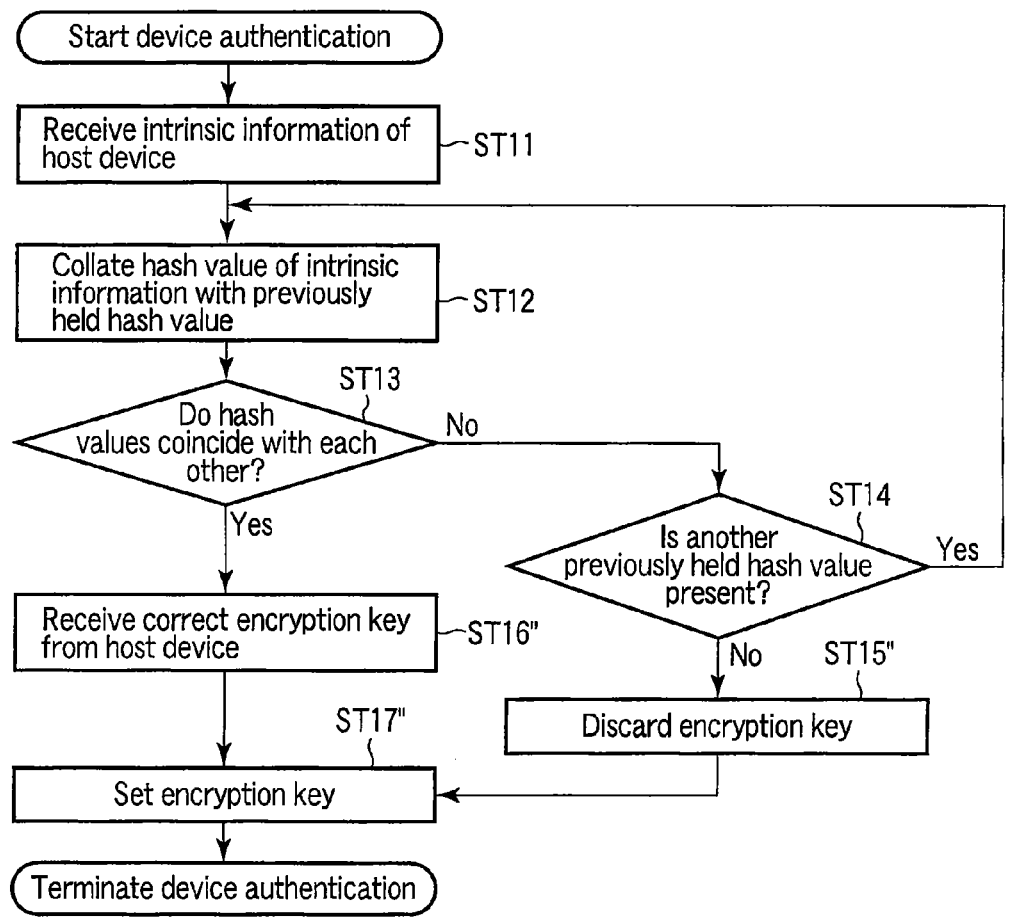
FIG. 31 is an exemplary flowchart for explaining an operation in a modification of the second embodiment.
Figure 32:
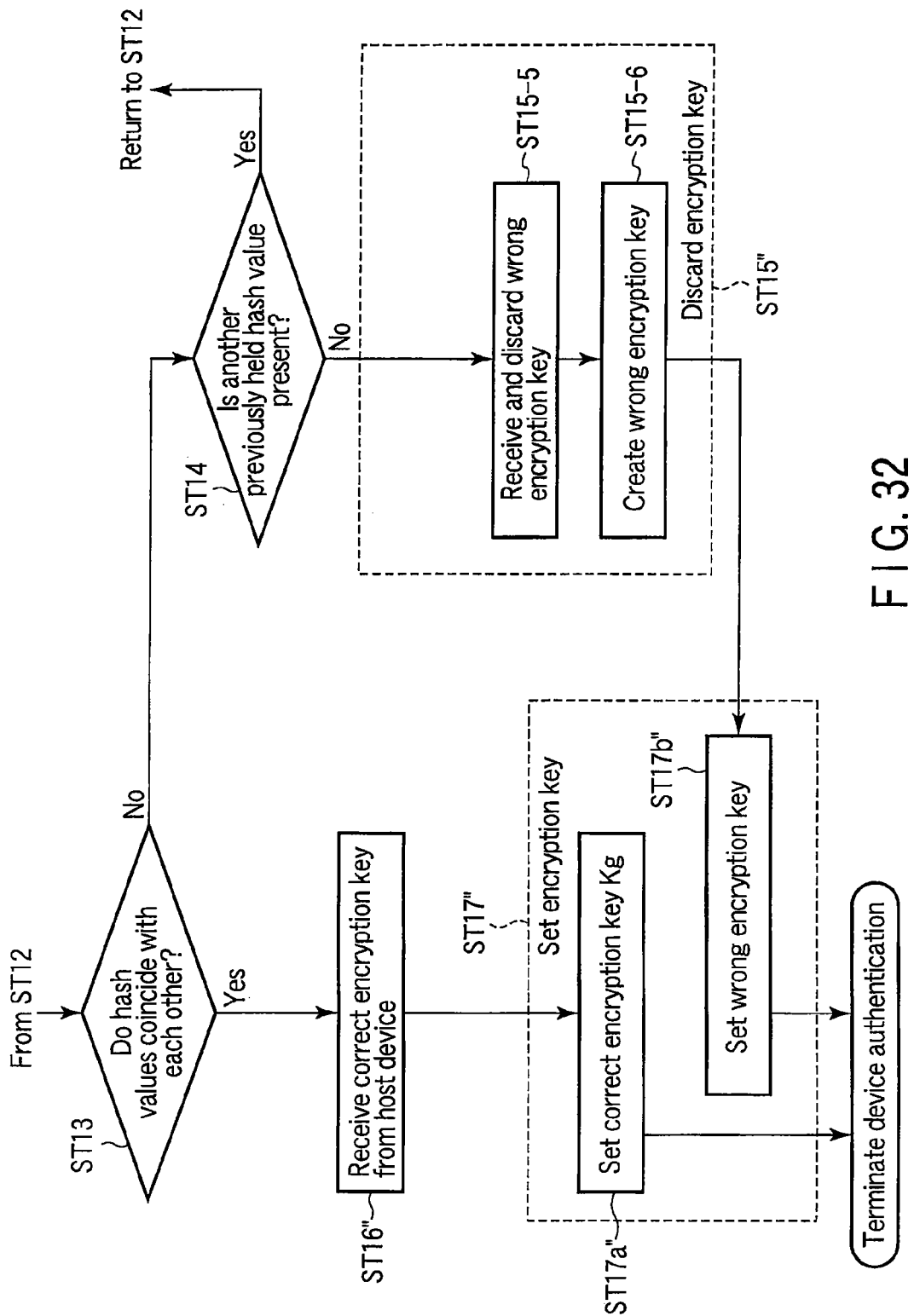
FIG. 32 is an exemplary flowchart for explaining an operation in the modification.

In a modification of the second embodiment, as shown in FIG. 31 and FIG. 32, the blocks ST15" to ST17" are modified in accordance with the above description.

In the block ST15", the device authentication module 21 discards the encryption key received from the current host device 30B (ST15-5) and creates a wrong encryption key by using, e.g., a random number (ST15-6).

On the other hand, if a judgment result in the block ST13 represents coincidence, the device authentication module 21 receives the encryption key Kg from the current host device 30A (ST16") and writes this encryption key Kg into the static RAM 25 (ST 17a").

It is to be noted that, when the encryption key was discarded in the block ST15", the device authentication module 21 writes the wrong encryption key created in the block ST15-6 into the static RAM 25 (ST17b").

As described above, even if the configuration that the encryption key is received from the host device 30A (or 30B, . . . ) is adopted, since the encryption key is discarded when the device authentication has failed like the above example, the same effects as those of the second embodiment can be obtained.

<Modification of Third Embodiment>

Although not shown, in a modification of the third embodiment, the blocks 15', ST16', and ST17 are modified as indicated by blocks ST15", ST15", and ST17" like the modification of the second embodiment.

As described above, even if the configuration that the encryption key is received from the host device 30A is adopted, since the encryption key is discarded when the device authentication has failed like the above example, the same effects as those of the third embodiment can be obtained.

<Modification of Fourth Embodiment>

Although not shown, the fourth embodiment is modified as indicated by blocks ST15", ST16", and ST17" like the modifications of the respective first to third embodiments.

As described above, even if the configuration that the encryption key is received from the host device 30A (or 30B, . . . ) is adopted, since the encryption key is discarded when the device authentication has failed like the above example, the same effects as those of the fourth embodiment can be obtained.

<Modification of Fifth Embodiment>

In a modification of the fifth embodiment, as described above, the first partial key in the system area 11a and the second partial key in the memory 32A are omitted and, on the other hand, the encryption key Kg is held in the memory 32A in advance.

Therefore, in the modification of the fourth embodiment, propriety information indicating whether the encryption is to be discarded is stored in the system area 11a in place of the propriety information indicating whether the first partial key is to be discarded.

Further, the device authentication module 21 has a setting function of setting propriety information in the system area 11a upon receiving a setting request including the propriety information from the legitimate host device 30A in addition to each function described above.

Furthermore, the device authentication module 21 has a discard avoiding function of avoiding the discard of the encryption key based on the propriety information in the system area 11a when the device authentication has failed. Supplementarily, it avoids the discard if disabling the discard of the propriety information is set.

Moreover, the device authentication module 21 also has an error output function of outputting a device authentication error to the current host device 30B, . . . without operating the encryption key writing function, the user authentication module 22, and the decryption module 24 when the discard of the encryption key is avoided.

The input module 33 and the CPU 34 in the host device 30A are equal to those in the fifth embodiment.

As described above, even if the configuration that whether the encryption key is to be discarded can be set based on the propriety information is adopted, the same effects as those in the fifth embodiment can be obtained.

<Modification of Sixth Embodiment>

In a modification of the sixth embodiment, the system area 11a stores the number of times of allowable connections (the number of times of possible retries) representing the number of times of new connections allowed until the encryption key is discarded in place of the number of times of allowable connections (the number of times of possible retries) representing the number of times of new connections allowed until the first partial key is discarded.

The setting function and the error number updating function of the device module 21 are the same as those described above.

The device authentication module 21 has a discard avoiding function of avoiding discard of the encryption key based on the number of errors after update and the number of times of allowable connections in the system area 11a.

Additionally, the device authentication module 21 has an error output function of outputting a device authentication error to the current host device 30A (or 30B, . . . ) without operating the encryption key writing function, the user authentication module 22, and the decryption module 24 when the discard of the encryption key is avoided.

The configuration of the host device 30A is the same as that in the sixth embodiment.

As described above, even if the configuration that whether the encryption key is to be discarded can be set based on the number of times of allowable connections is adopted, the same effects as those of the sixth embodiment can be obtained.

<Modification of Seventh Embodiment>

In a modification of the seventh embodiment, the system area 11a stores discard log information when the encryption key is discarded in place of the discard log information when the first partial key is discarded.

The discard log information Lg includes discard date and time information indicative of a date and time when the encryption key is discarded and a discard reason information indicative of a device authentication failure.

The device authentication module 21 has a discard log writing function of creating the discard log information Lg and writing it into the system area 11a when the encryption key is discarded in addition to each of the above-described functions. This discard log information Lg can be read out from the system area 11a in response to a read request from the legitimate host device 30A.

As described above, even if the configuration that the discard log information Lg is stored when the encryption key has been discarded is adopted, the same effects as those of the seventh embodiment can be obtained.

<Modification of Eighth Embodiment>

A modification of the eighth embodiment provides a configuration that the discard certificate Cert is stored when the encryption key has been discarded, thus obtaining the same effects as those of the eighth embodiment.

<Modification of Ninth Embodiment>

In a modification of the ninth embodiment, the user authentication module 22 discards the encryption key based on a key discarding function when a user authentication failure has been determined from a difference from a specified authentication sequence, thereby obtaining the same effects as those of the ninth embodiment.

<Modification of Tenth Embodiment>

In a modification of the tenth embodiment, the system area 11a stores propriety information representing whether the encryption key is to be discarded in place of the propriety information representing whether the first partial key and the third partial key are to be discarded.

The user authentication module 22 has a setting function of setting propriety information in the system area 11a upon receiving a setting request including the propriety information from the legitimate host device 30A in addition to each function described above.

Further, the user authentication module 22 has a discard avoiding function of avoiding discard of the encryption key based on propriety information in the system area when the user authentication has failed. Supplementarily, it avoids the discard when disabling the discard of the propriety information is set.

Furthermore, the user authentication module 22 has an error output function of outputting a user authentication error to the current host device 30A (or 30B, . . . ) without operating the decryption module 24 when the discard of the encryption key has been avoided.

The input module 33 and the CPU 34 of the host device 30A are equal to those in the tenth embodiment.

As described above, even if the configuration that whether the encryption key is to be discarded can be set based on the propriety information is adopted, the same effects as those of the tenth embodiment can be obtained.

<Modification of Eleventh Embodiment>

In a modification of the eleventh embodiment, the system area 11a stores the number of times of allowable connections (the number of times of possible retries) representing the number of times of new connections allowed until the encryption key is discarded in place of the number of times of allowable connections (the number of times of possible retries) representing the number of times of new connection allowed until the first partial key and the third partial key are discarded.

The setting function and the error number updating function of the user module 22 are the same as those described above.

The user authentication module 22 has a discard avoiding function of avoiding discard of the encryption key based on the number of errors after update and the number of times of allowable connections in the system area 11a.

Additionally, the user authentication module 22 has an error output function of outputting a device authentication error to the current host device 30A (or 30B, . . . ) without operating the decryption module 24 when the discard of the encryption key has been avoided.

The configuration of the host device 30A is the same as that in the eleventh embodiment.

As described above, even if the configuration that whether the encryption key is to be discarded can be set based on the number of times of allowable connections is adopted, the same effects as those of the eleventh embodiment can be obtained.

<Modification of twelfth Embodiment>

In a modification of the twelfth embodiment, discard log information when the encryption key has been discarded is stored in the system area 11a in place of the discard log information when the first partial key and the third partial key have been discarded.

The discard log information Lg includes discard date and time information indicative of a date and time when the encryption key is discarded and a discard reason information indicative of a user authentication failure.

The user authentication module 22 has a discard log writing function of creating the discard log information Lg and writing it into the system area 11a when the encryption key has been discarded in addition to each of the above-described functions. This discard log information Lg can be read out from the system area 11a in response to a read request from the legitimate host device 30A.

As described above, even if the configuration that the discard log information Lg is stored when the encryption key has been discarded is adopted, the same effects as those of the seventh embodiment can be obtained.

<Modification of Thirteenth Embodiment>

A modification of the thirteenth embodiment provides a configuration that the discard certificate Cert is stored when the encryption key has been discarded, thus obtaining the same effects as those of the thirteenth embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device that has a volatile memory in which data is erased when a power supply is turned off and is detachably connectable to arbitrary host devices, comprising:
    an authentication information memory device configured to store first device authentication information used for performing device authentication and first user authentication information used for authenticating a user;
    a partial key memory device configured to store a first partial key;
    an encrypted data memory device configured to store encrypted data;
    a device authentication module configured to execute device authentication based on second device authentication information received from a newly connected host device and the first device authentication information, and to destroy the first partial key when the device authentication has failed;
    a third partial key write module configured to combine a second partial key received from the newly connected host device with the first partial key stored in the partial key memory device when the device authentication has not failed or a newly generated first partial key when the device authentication has failed, to generate a third partial key and to write the generated third partial key into the volatile memory;
    a user authentication module configured to execute user authentication based on second user authentication information received from the newly connected host device and the first user authentication information after writing the third partial key;
    an encryption key write module configured to combine the third partial key in the volatile memory with the second user authentication information to generate an encryption key and to write the generated encryption key into the volatile memory; and
    a decryption module configured to decrypt the encrypted data based on the encryption key in the volatile memory in response to a read request received from the current host device and to output the decrypted data to the current host device when the user authentication has succeeded.

2. The device of claim 1,
wherein the first device authentication information is a hash value of intrinsic information of a legitimate host device,
the second device authentication information is intrinsic information of current newly connected host device that is also used as the second partial key,
the second partial key is intrinsic information of the newly connected host device that is also used as the second device authentication information, and
the device authentication module is configured to calculate a hash value of the second device authentication information, collate the calculated hash value with the first device authentication information, and to determine that the device authentication has failed when both pieces of data do not coincide with each other.

3. The device of claim 1,
wherein the first device authentication information is a signature verification key of a legitimate host device,
the second device authentication information is a digital signature generated by the signature generation key of the newly connected host device and signature target data used for generating the digital signature, and
the device authentication module is configured to decrypt the digital signature based on the signature verification key, collate obtained decrypted data with a hash value calculated from the signature target data, and to determine that the device authentication has failed when both pieces of data do not coincide with each other.

4. The device of claim 1,
wherein the device authentication module is configured to determine that the device authentication has failed upon detecting that an authentication sequence when the newly connected host device transmits the second device authentication information is different from a specified authentication sequence.

5. The device of claim 1, further comprising:
    a proprietary information memory device configured to store proprietary information indicating whether the first partial key is to be destroyed;
    a setting module configured to set the proprietary information in the proprietary information memory device upon receiving a setting request including the proprietary information from a legitimate host device;
    an avoidance module configured to avoid destroying the first partial key based on the proprietary information in the proprietary information memory device when the device authentication has failed; and
    an error output module configured to output an error of the device authentication to the newly connected host device without operating the third partial key write module, the user authentication module, the encryption key write module, and the decryption module destroying the first partial key has been avoided.

6. The device of claim 1, further comprising:
    an allowable connection number memory device configured to store a number of times of allowable connections indicative of the number of times of new connections allowed until the first partial key is discarded;
    an error number memory device configured to store a number of errors indicative of the number of times that the device authentication has failed;
    a setting module configured to set the number of times of allowable connections in the allowable connection number memory device upon receiving a setting request including the number of times of allowable connections from a legitimate host device;
    an error number update module configured to update a number of errors in the error number memory device to increase when the device authentication has failed;
    an avoidance module configured to avoid destroying the first partial key based on the updated number of errors and the number of times of allowable connections in the allowable connection number memory device; and
    an error output module configured to output an error of the device authentication to the current host device without operating the third partial key write module, the user authentication module, the encryption key write module, and the decryption module when destroying the first partial key has been avoided.

7. The device of claim 1, further comprising:
    a log memory device configured to store log information including date and time information indicating a date and time of destroying the first partial key and information indicating the device authentication failure; and a log write module configured to create the log information and to write the log information into the discard log memory device when the first partial key has been destroyed.

8. The device of claim 7, further comprising:
a signature generation key memory device configured to store a signature generation key of a user's device in advance;
a signature generation module configured to perform signature processing to log information in the log memory device and thereby generate a digital signature based on the signature generation key; and
a certificate creation module configured to create a certificate consisting of the log information and the digital signature and to write the certificate into the log memory device.

9. The device of claim 1,
wherein the user authentication module comprises a key discard module configured to destroy the first partial key in the partial key memory device and the third partial key in the volatile memory when the user authentication has failed for a specified number of times.

10. The device of claim 9, further comprising:
a proprietary information memory device configured to store proprietary information indicating whether the first partial key and the third partial key are to be destroyed;
a setting module configured to set the proprietary information in the proprietary information memory device upon receiving a setting request including the proprietary information from a legitimate host device;
an avoidance module configured to avoid destroying the first partial key and the third partial key based on the proprietary information in the proprietary information memory device when the user authentication has failed; and
an error output module configured to output an error of the user authentication to the current host device without operating the decryption module when destroying the first partial key and the third partial key has been avoided.

11. A memory system comprising:
a memory device that has a volatile memory in which data is erased when a power supply is turned off and is detachably connectable to arbitrary host devices; and
a legitimate host device having a connection right with respect to the memory device in the arbitrary host devices,
wherein the memory device comprises:
an authentication information memory device configured to store first device authentication information used for performing device authentication and first user authentication information used for authenticating a user;
a partial key memory device configured to store a first partial key;
an encrypted data memory device configured to store encrypted data;
a device authentication module configured to execute device authentication based on second device authentication information received from a newly connected current host device and the first device authentication information and to destroy the first partial key when the device authentication has failed;
a third partial key write module configured to combine a second partial key received from the newly connected host device with the first partial key stored in the partial key memory device when the device authentication has not failed or a newly generated first partial key when the device authentication has failed, to generate a third partial key and to write the generated third partial key into the volatile memory;
a user authentication module configured to execute user authentication based on second user authentication information received from the newly connected host device and the first user authentication information after writing the third partial key;
an encryption key write module configured to combine the third partial key in the volatile memory with the second user authentication information to generate an encryption key and to write the generated encryption key into the volatile memory; and
a decryption module configured to decrypt the encrypted data based on the encryption key in the volatile memory in response to a read request received from the current host device and to output the decrypted data to the current host device when the user authentication has succeeded, and
the legitimate host device comprises:
a device authentication information memory device configured to store the second device authentication information;
a device authentication information transmission module configured to transmit the second device authentication information in the device authentication information memory device to the memory device in accordance with a specified authentication sequence of the device authentication executed by the device authentication module when the memory device is connected;
a user authentication information acceptance module configured to accept input of the second user authentication information;
a user authentication information transmission module configured to transmit the accepted second user authentication information to the memory device;
a read request acceptance module configured to accept input of the read request; and
a read request transmission module configured to transmit the accepted read request to the memory device.

12. The system of claim 11,
wherein the first device authentication information is a hash value of intrinsic information of the legitimate host device,
the second device authentication information is intrinsic information of the current host device that is also used as the second partial key,
the second partial key is intrinsic information of the current host device that is also used as the second device authentication information, and
the device authentication module is configured to calculate a hash value of the second device authentication information, collate the calculated hash value with the first device authentication information, and to determine that the device authentication has failed when both pieces of data do not coincide with each other.

13. The system of claim 11,
wherein the first device authentication information is a signature verification key of the legitimate host device,
the second device authentication information is a digital signature generated by the signature generation key of the current host device and signature target data used for generating the digital signature, and
the device authentication module is configured to decrypt the digital signature based on the signature verification key, collate obtained decrypted data with a hash value calculated from the signature target data, and to determine that the device authentication has failed when both pieces of data do not coincide with each other.

14. The system of claim 11,
wherein the device authentication module is configured to determine that the device authentication has failed upon detecting that an authentication sequence when the current host device transmits the second device authentication information is different from a specified authentication sequence.

15. The system of claim 11,
wherein the memory device further comprises:
a proprietary information memory device configured to store propriety information indicating whether the first partial key is to be destroyed;
a setting module configured to set the proprietary information in the proprietary information memory device upon receiving a setting request including the proprietary information from the legitimate host device;
an avoidance module configured to avoid destroying the first partial key based on the proprietary information in the proprietary information memory device when the device authentication has failed; and
an error output module configured to output an error of the device authentication to the current host device without operating the third partial key write module, the user authentication module, and the decryption module when destroying the first partial key has been avoided, and
the legitimate host device further comprises:
a setting request acceptance module configured to accept input of a setting request including the proprietary information; and
a setting request transmission module configured to transmit the accepted setting request to the memory device.

16. The system of claim 11,
wherein the memory device further comprises:
an allowable connection number memory device configured to store a number of times of allowable connections indicative of the number of times of new connections allowed until the first partial key is destroyed;
an error number memory device configured to store a number of errors indicative of the number of times that the device authentication has failed;
a setting module configured to set the number of times of allowable connections in the allowable connection number memory device upon receiving a setting request including the number of times of allowable connections from the legitimate host device;
an error number update module configured to update a number of errors in the error number memory device to increase when the device authentication has failed;
an avoidance module configured to avoid destroying the first partial key based on the updated number of errors and the number of times of allowable connections in the allowable connection number memory device; and
an error output module configured to output an error of the device authentication to the current host device without operating the third partial key write module, the user authentication module, and the decryption module when the discard of the first partial key has been avoided, and
the legitimate host device further comprises:
a setting request acceptance module configured to accept input of a setting request including the number of times of allowable connections; and
a setting request transmission module configured to transmit the accepted setting request to the memory device.

17. The system of claim 11,
wherein the memory device further comprises:
a log memory device configured to store log information including date and time information indicating a date and time of destroying the first partial key and information indicating the device authentication failure; and
a log write module configured to create the log information and to write the discard log information into the discard log memory device when the first partial key has been destroyed.

18. The system of claim 17,
wherein the memory device further comprises:
a signature generation key memory device configured to store a signature generation key of a user's device in advance;
a signature generation module configured to perform signature processing to log information in the log memory device and thereby generate a digital signature based on the signature generation key; and
a certificate creation module configured to create a certificate consisting of the log information and the digital signature and to write the certificate into the log memory device.

19. The system of claim 11,
wherein the user authentication module comprises a key discard module configured to destroy the first partial key in the partial key memory device and the third partial key in the volatile memory when the user authentication has failed for a specified number of times.

20. An authentication method executed by a memory device that has a volatile memory in which data is erased when a power supply is turned off and is detachably connectable to arbitrary host devices,
the method comprising:
writing first device authentication information used for performing device authentication;
writing first user authentication information used for authenticating a user;
writing a first partial key;
executing device authentication based on second device authentication information received from a newly connected host device and the first device authentication information and destroying the first partial key when the device authentication has failed;
combining a second partial key received from the newly connected host device with the first partial key when the device authentication has not failed or a newly generated first partial key when the device authentication has failed, to generate a third partial key and to write the generated third partial key into the volatile memory;
executing user authentication based on second user authentication information received from the newly connected host device and the first user authentication information after writing the third partial key;
combining the third partial key in the volatile memory with the second user authentication information to generate an encryption key and write the generated encryption key into the volatile memory; and
decrypting the encrypted data based on the encryption key in the volatile memory and outputting the decrypted data to the current host device in response to a read request received from the current host device when the user authentication has succeeded.

* * * * *